United States Patent [19]
Williamson

[11] Patent Number: 5,570,483
[45] Date of Patent: Nov. 5, 1996

[54] MEDICAL PATIENT TRANSPORT AND CARE APPARATUS

[76] Inventor: Theodore A. Williamson, 527 E. Kingston Ave., Charlotte, N.C. 28203-5117

[21] Appl. No.: 440,005

[22] Filed: May 12, 1995

[51] Int. Cl.$^6$ ..................................................... A61G 7/10
[52] U.S. Cl. .................... 5/83.1; 5/86.1; 5/658; 5/600
[58] Field of Search .................... 5/600, 81.1, 83.1, 5/85.1, 86.1, 89.1, 658, 507.1, 512, 662

[56] References Cited

U.S. PATENT DOCUMENTS

| | | | |
|---|---|---|---|
| 885,329 | 4/1908 | Ellis | 5/86.1 |
| 1,227,301 | 5/1917 | Ogden | 5/85.1 |
| 1,270,136 | 6/1918 | Finley | 5/86.1 |
| 2,272,778 | 2/1942 | Reuter | 5/85.1 |
| 2,873,456 | 2/1959 | Joy | 5/600 |
| 3,091,286 | 5/1963 | Madsen | 5/512 |
| 3,877,089 | 4/1975 | Spivey et al. | 5/81.1 |
| 4,232,412 | 11/1980 | Petrini . | |
| 4,571,758 | 2/1986 | Samuelsson . | |
| 4,584,989 | 4/1986 | Stith . | |
| 4,627,119 | 12/1986 | Hachey et al. | 5/83.1 |
| 4,682,377 | 7/1987 | Reich . | |
| 4,723,327 | 2/1988 | Smith . | |
| 4,768,241 | 9/1988 | Beney | 5/658 |
| 4,805,248 | 2/1989 | Lunau . | |
| 4,813,088 | 3/1989 | DiMatteo et al. . | |
| 4,829,612 | 5/1989 | Adams . | |
| 4,839,933 | 6/1989 | Plewright et al. . | |
| 4,944,056 | 7/1990 | Schroeder et al. . | |
| 4,945,582 | 8/1990 | Hayton et al. . | |
| 4,953,245 | 9/1990 | Jung . | |
| 4,957,121 | 9/1990 | Icenogle et al. . | |
| 4,964,182 | 10/1990 | Schmerier . | |
| 4,987,623 | 1/1991 | Stryker et al. . | |
| 5,005,230 | 4/1991 | Congdon . | |
| 5,005,233 | 4/1991 | Toivio et al. . | |
| 5,014,968 | 5/1991 | Lammers et al. . | |
| 5,020,171 | 6/1991 | DiMatteo et al. . | |
| 5,022,105 | 6/1991 | Catoe . | |
| 5,065,464 | 11/1991 | Blanchard et al. . | |
| 5,077,844 | 1/1992 | Twitchell et al. . | |
| 5,083,331 | 1/1992 | Schnelle et al. . | |
| 5,084,921 | 2/1992 | Hicks, Jr. . | |

(List continued on next page.)

FOREIGN PATENT DOCUMENTS 2275604  9/1994  United Kingdom ...................... 5/85.1

OTHER PUBLICATIONS

Ryden, L. Alicia et al, "Occupational Low–Back Injury in a Hospital Population: An Epidemiologic Analysis of Multiple Risk Factors of a High–Risk Occupational Group," Spine, 1989, vol. 14, No. 3, pp. 315–320.

U.S. Department of Commerce, Bureau of the Census, "County Business Patterns, United States: Establishments, Employees, and Payroll, by Industry and Employment–Size Class, 1992," 1993, pp. 69–70.

Wilkinson, William E. et al, "Occupational Injuries: A Study of Health Care Workers at a Northwestern Health Science Center and Teaching Hospital," AAOHN Journal, Jun. 1992, vol. 40, No. 6, pp. 287–293.

Owen, Bernice D., "The Lifting Process and Back Injury in Hospital Nursing Personnel," Western Journal of Nursing Research, 1985, vol. 7, No. 4, pp. 445–459.

(List continued on next page.)

*Primary Examiner*—Michael F. Trettel
*Attorney, Agent, or Firm*—Shefte, Pinckney & Sawyer

[57] ABSTRACT

A patient transport and care apparatus includes a skeletal frame structure having a superstructure defining a patient support area which is configured to fit over a conventional patient support platform. One end of the skeletal frame structure is open so that the device may be rolled into and out of surrounding relation with the patient support structure. The device also includes a patient lifting system, a weighing system and an electrical distribution system. Various patient care accessories, equipment and medication may be carried conveniently on the apparatus.

67 Claims, 23 Drawing Sheets

U.S. PATENT DOCUMENTS

| | | |
|---|---|---|
| 5,084,922 | 2/1992 | Louit . |
| 5,090,072 | 2/1992 | Gray . |
| 5,093,944 | 3/1992 | Winston, Sr. . |
| 5,127,113 | 7/1992 | DiMatteo et al. . |
| 5,148,557 | 9/1992 | Fridman et al. . |
| 5,148,559 | 9/1992 | Morris . |
| 5,153,953 | 10/1992 | Sumrall . |
| 5,165,838 | 11/1992 | Kallansrade et al. . |
| 5,173,977 | 12/1992 | Curruth et al. . |
| 5,185,895 | 2/1993 | Gagne et al. . |
| 5,189,741 | 3/1993 | Beardmore . |
| 5,193,233 | 3/1993 | Miller . |
| 5,233,708 | 8/1993 | Winston, Sr. . |
| 5,239,713 | 8/1993 | Toivio et al. . |
| 5,251,862 | 10/1993 | Raymond . |
| 5,257,425 | 11/1993 | Shinabarger . |
| 5,271,110 | 12/1993 | Newman . |
| 5,309,584 | 5/1994 | Parker . |
| 5,315,723 | 5/1994 | Smith . |
| 5,319,813 | 6/1994 | DiMatteo et al. . |
| 5,319,817 | 6/1994 | Hay et al. . |

OTHER PUBLICATIONS

Personick, Martin E., "Nursing Home Aides Experience Increase in Serious Injuries," Monthly Labor Review, Feb. 1990, pp. 30–37.

Ross, Peggy, "Ergonomic Hazards in the Workplace," AAOHN Journal, Apr. 1994, vol. 42, No. 4, pp. 171–176.

Larese, F. et al, "Musculoskeletal Disorders in Hospital Nurses: A Comparison Between Two Hospitals," Ergonomics, 1994, vol. 37, No. 7, pp. 1205–1211.

McAbee, Roberta Rae et al, "Back Injuries and Registered Nurses," AAOHN Journal, Mar. 1988, vol. 36, No. 3, pp. 106–112.

Moses, Evelyn B. (ed.), "The Registered Nurse Population: Findings from the National Sample Survey of Registered Nurses, Mar. 1992", U.S. Department of Health & Human Services, Public Health Service.

Garg, A. et al, "Reducing Back Stress to Nursing Personnel: An Ergonomic Intervention in a Nursing Home," Ergonomics, 1992, vol. 35, No. 11, pp. 1353–1375.

Garrett, Barbara et al, "Back Injuries Among Nursing Personnel," AAOHN Journal, Nov. 1992, vol. 40, No. 11, pp. 510–516.

Gundewall, Brita et al, "Primary Prevention of Back Symptoms and Absence From Work: A Prospective Randomized Study Among Hospital Employees," Spine, vol. 18, No. 5, pp. 587–594.

Bureau of Labor Statistics, U.S. Department of Labor, "Unpublished Tabulations from the Current Population Survey: 1993 Annual Averages".

Calise, Angela K., "Back Injuries Still Most Costly for Insurers," National Underwriter, Nov. 18, 1991, pp. 12 and 50.

Garg, Arun, "An Evaluation of NIOSH Guidelines for Manual Lifting, with Special Reference to Horizontal Distance," Journal of the American Industrial Hygiene Association, Mar. 1989, vol. 50, pp. 157–164.

Bowman, Josie M., "The Meaning of Chronic Low Back Pain," AAOHN Journal, Aug. 1991, vol. 39, No. 8, pp. 381–384.

Buckle, Peter, "Epidemiological Aspects of Back Pain Within the Nursing Profession," International Journal of Nursing Studies, 1987, vol. 24, No. 4, pp. 319–324.

Bureau of Labor Statistics, U.S. Department of Labor, "Number of Nonfatal Occupational Injuries and Illnesses," Nov. 1994.

Winkelmolen, G. H. M. et al, "An Evaluation of Patient Lifting Techniques," Ergonomics, 1994, vol. 37, No. 5, pp. 921–932.

MEDICAL PATIENT TRANSPORT AND CARE APPARATUS

BACKGROUND OF THE INVENTION

The present invention relates broadly to apparatus for lifting and moving hospital patients within the hospital environment and, more specifically, to a patient transport and care apparatus for use when transporting human or animal hospitalized patients in a hospital environment without significant imposition on the patient.

Under many circumstances, a hospital stay means loss of mobility for some patients, dependent on the nature of their respective medical problems. Patients who have experienced loss of mobility present a unique problem for hospital personnel when faced with patient movement and other patient functions. Functions normally performed relying on the patient's locomotion include weight measurement and general movement throughout the hospital environment, typically associated with medical testing procedures. Additionally, for those unfortunate enough to be delivered to the hospital emergency room, transportation must be arranged between the emergency room and operating rooms or patient care rooms.

Currently, two general methods are used to transport patients in a hospital environment, both of which involve imposing on the patient who may experience discomfort, pain or worse by being manually manipulated by hospital personnel. First, the patient may be transported on a wheeled platform such as a bed. Secondly, the patient may be transported on a stretcher or gurney. Several disadvantages exist with these current methods of patient Perhaps the most significant, and most often overlooked, disadvantage to patient transport requiring manual manipulation is the health related effects on the attendant care provider, whether a nurse, doctor, orderly or volunteer. Ironically, the industry with the highest number of back injuries is the health care industry which is the third largest employer in the United States, employing approximately 10,533,000 people—approximately one out of every 11 members of the American work force. It should be neither shocking nor surprising that health care settings are among the most hazardous places to work, given the level of biomedical hazards throughout the hospital environment. What may be unexpected is the high level of biomechanical stress induced on hospital personnel by manual lifting and transferring patients.

Several studies have concluded that these tasks are the most recognizable cause of biomechanical stress in health care personnel, with the majority of the biomechanical stress imposed on health care personnel causing back injury. As may be expected, such back injury can shorten the careers of health care personnel, as well as increasing worker compensation claims, causing rising insurance rates and increasing absenteeism within the industry. Further, such back problems must be treated, thereby increasing the work load on the non-injured health care personnel to treat and care for the members of their own industry injured on the job. Unique to the health care industry is that treatment for on-the-job injuries is provided within the affected industry. Therefore, the impact of on-the-job injuries within the health care industry is greater than the mere loss of personnel. Accordingly, as on-the-job injuries mount, the effect on the entire industry is magnified. Conversely, any reduction of on-the-job injury provides benefits which are also magnified with respect to other industries. It is therefore even more crucial, from a strictly pragmatic viewpoint, to provide a safe environment for health care personnel than with other industries. Aside from the moral obligation of providing a safe work environment, real monetary benefits result from safety enhancement in the form of stress reduction throughout the industry, less absenteeism, lower insurance rates, increased time available for other patients, and longer careers among health care personnel.

Since lower back injury has been identified as the most recognizable cause of on-the-job injury within the health care environment, it would be logical to target the reduction of back injury as a primary goal in worker safety within the health care industry. According to the Bureau of Labor Statistics, of over 100,000 cases involved in overexertion or excess biomechanical stress in the health care industry, over 60,000 involved lifting. While the problem has not gone unrecognized, solutions tend to involve techniques employable by personnel rather than equipment.

In theory, the techniques employed for lifting and transport can reduce the chance of injury. Nevertheless, the problem of lifting a patient is not merely one of overcoming significant mass under the force of gravity. The patient's physical condition, including overall shape, deformities, and other physical impairments, may affect the way a transfer can be carried out. Further, some patients can be uncooperative, combative, or even violent. In addition, the violence may manifest itself suddenly, requiring extra effort on behalf of the hospital personnel. Therefore, optimum body postures as advocated with lifting techniques cannot always be assumed due to the aforesaid patient problems as well as space limitations, equipment handling and furniture interference. As is often the case, reality can overwhelm even the most finely honed learned techniques.

Accordingly, there exists a need for equipment which can reduce the chance of back injury to health care personnel. Since patient lifting and transporting is a primary cause of back injury, it would follow that the ideal choice for such equipment would be a patient lifting and transport apparatus. Further, such an apparatus could be enhanced by reducing the intrusion upon the patient, thereby reducing the effect of patient gyrations upon health care personnel.

SUMMARY OF THE INVENTION

It is accordingly an object of the present invention to provide an apparatus which addresses the above-discussed problems. More particularly, it is an object of the present invention to provide a patient transport and care apparatus which is easily operable by hospital personnel and which minimizes intrusion upon the patient.

It is another object of the present invention to provide such an apparatus which can reduce the effort required to move a patient between the patient room and testing facilities, as well as moving a patient from emergency facilities to the patient room.

It is another object of the present invention to provide such an apparatus which can lift a patient from the floor to a transportable support position.

It is yet another object of the present invention to provide such an apparatus which can effectively weigh a patient. Still another object of the present invention is to provide such an apparatus which can provide transportable support for patient care accessories.

To that end, a medical patient transport and care apparatus for use when transporting human or animal hospitalized patients in a hospital environment without significant intrusion on the patient includes an upstanding, skeletal frame structure having a plurality of wheels mounted thereto for rolling surface contact. A patient support area is defined by the frame structure which is formed of a size and configuration to be selectively movable in and out of a generally surrounding relationship with a floor-standing patient support structure, such as a table, bed or gurney. In furtherance of that, the frame structure includes at least one open end portion for providing access to the patient support area when rolling the frame structure in and out of the surrounding relationship with the floor-standing patient support structure. The apparatus further includes at least one gate hingedly mounted to the frame structure adjacent the open end portion and movable between an opened condition away from the end portion for rolling movement of the frame structure into and out of said surrounding relationship and a closed condition in covering relation with the open end portion.

The apparatus further includes an assembly for supporting a patient, the assembly being selectively mountable to the frame and movable between a patient support disposition and a storage disposition. The frame structure preferably includes a superstructure projecting upwardly beyond the patient support area. The superstructure has a plurality of horizontally oriented support members. It is preferred that the frame structure include a power distribution system thereassociated.

The present invention preferably includes an assembly for lifting the patient support assembly within the frame structure and the lifting assembly is mounted to the frame structure. It is further preferred that a weighing assembly be mounted to the frame structure in association with the lifting assembly. Preferably, the weighing assembly includes a scale which also includes a load cell operatively connected to the patient support assembly with the load cell producing an electrical signal proportional to the gravitational force exerted on the patient support assembly for displaying a numerical value associated with the gravitation force responsive to input from the load cell.

The lifting assembly includes an electric motor, a geared transmission operatively connected thereto, with the electric motor and the transmission being mounted to the horizontally oriented support members of the superstructure. The lifting assembly further includes an assembly for operatively connecting the electric motor and the transmission to patient support assembly and the assembly for selectively controlling the operation of the lifting assembly. Preferably, the electric motor is a DC motor and the lifting assembly further includes an arrangement for storing and supplying DC electric power associated with the DC motor, which is preferably a battery. Further, an assembly is provided for charging the electric power storage arrangement, and an assembly for supplying electric power from the electrical power distribution system to the charging system is provided.

It is preferred that the patient support assembly include a flexible patient support platform formed from flexible sheet material and supportable along side edges thereof by the frame structure. The platform is selectively movable transversely across the patient support area between a gathered, storage position and an extended position for patient support. It is further preferred that the platform include at least one rigid pole attached thereto and extending longitudinally with respect to the platform. The frame structure then preferably includes a plurality of hooking clamps mounted thereto for engaging and retaining the pole, and thereby the platform, to maintain the platform at a predetermined position. The platform may include a plurality of grommeted openings formed therein and positioned for use as anchoring locations for patient restraint devices. The platform may also include at least one vertically extending barrier portion projecting upwardly from the platform adjacent the side edges thereof for preventing lateral patient movement beyond side edges of the platform. The barrier portion is formed integrally with and from the same sheet material as the platform and includes an assembly to retain and support patient care equipment thereon. The arrangement to support and retain patient care equipment includes at least one pocket attached to an inwardly directed surface of the barrier portion, which is configured to retain a bedpan.

It is further preferred that the frame structure include at least one brake operably attached to at least one of the plurality of wheels, the brake being operable to selectively prevent unwanted rolling motion of the apparatus.

It is preferred that the patient support assembly include two patient support platforms formed from flexible sheet material and supportable along side edges thereof by the frame structure. The platforms are mounted to the frame structure with one platform disposed in a spaced vertical relationship with the other platform. The platforms are both movable across the patient support area between a gathered, storage position and an extended position for patient support.

Preferably, the lifting assembly includes a pair of support braces operatively connected to the electric motor and selectively attachable to and detachable from the patient support assembly for selectively lifting a patient. The support braces are movable between a storage position and an operative position and the superstructure includes an arrangement for retaining the support braces in the storage position.

As previously stated, the frame structure is open at one end for rolling movement into and out of a surrounding relationship with the floor-standing patient support structure. Accordingly, the present invention further includes at least one gate hingedly mounted to the frame adjacent the open end portion and movable between an opened condition away from the at least one open end portion for rolling movement of the frame structure in and out of the surrounding relationship and a closed condition in covering relation with the open end portion.

One of the more distressing problems associated with patient transport on a conventional stretcher or gurney is the inability to sufficiently provide for support for the various equipment and accessories provided for patient support. This sometimes leads to the situation wherein equipment or accessories are placed on the stretcher or bed with the patient and under certain conditions himself is pressed into service to hold on to the equipment or is otherwise inconvenienced in having to share the patient support with the equipment. To that end, the present invention provides an assembly for caring for a patient mounted to the frame structure. The patient care assembly includes at least one of an oxygen bottle and an assembly for administering oxygen to a patient, an assembly for conducting an endotracheal intubation and a medication supply. Further, a shelf may be adjustably mounted to the superstructure with the shelf having a rotatable turntable mounted thereto and movable between a storage position and a usage position, the shelf and turntable being for the support of medical patient monitoring equipment. The superstructure also may include a plurality of tubular cross members having a plurality of utility hooks slidably mounted thereto. Additionally, the present invention may include a mirror for reflecting images mounted to the superstructure in a configuration for an operator to view the image of a patient supported on the patient support means. A patient trapeze may also be suspended from the superstructure for patient initiated patient stabilization and support. An assembly is mounted to the superstructure for storing the trapeze when not in use.

As previously discussed, a second platform may be mounted to the frame structure to assist in moving multiple patients in the event of a disaster or other inconvenience. To that end, at least one of the patient support platforms includes a plurality of wheels mounted along two side edges thereof, and the frame structure includes two raceways, or tracks, for supporting the wheels during rolling movement thereof and when the at least one platform is stationarily mounted thereto. Further, an assembly for releasably latching the wheel platform onto the frame structure with the wheel supported by the raceway is provided. In addition, the frame structure may include a plurality of hooks disposed at a position lower than that at which a patient is supported for suspending drainage bags therefrom. Also, a privacy curtain is provided which is movably mounted to the frame structure and selectively movable in and out of covering relation with a portion of the skeletal frame structure to provide selective privacy for a patient supported on the patient support assembly.

By the above, the present invention provides an apparatus beneficial to both patient and attendant. The device may be easily wheeled over a bed and the patient transferred from the bed to the apparatus. The apparatus provides the necessary equipment and accessories for caring for a patient in a convenient location away from patient interference.

DETAILED DESCRIPTION OF THE PREFERRED EMBODIMENT

Figure 1:
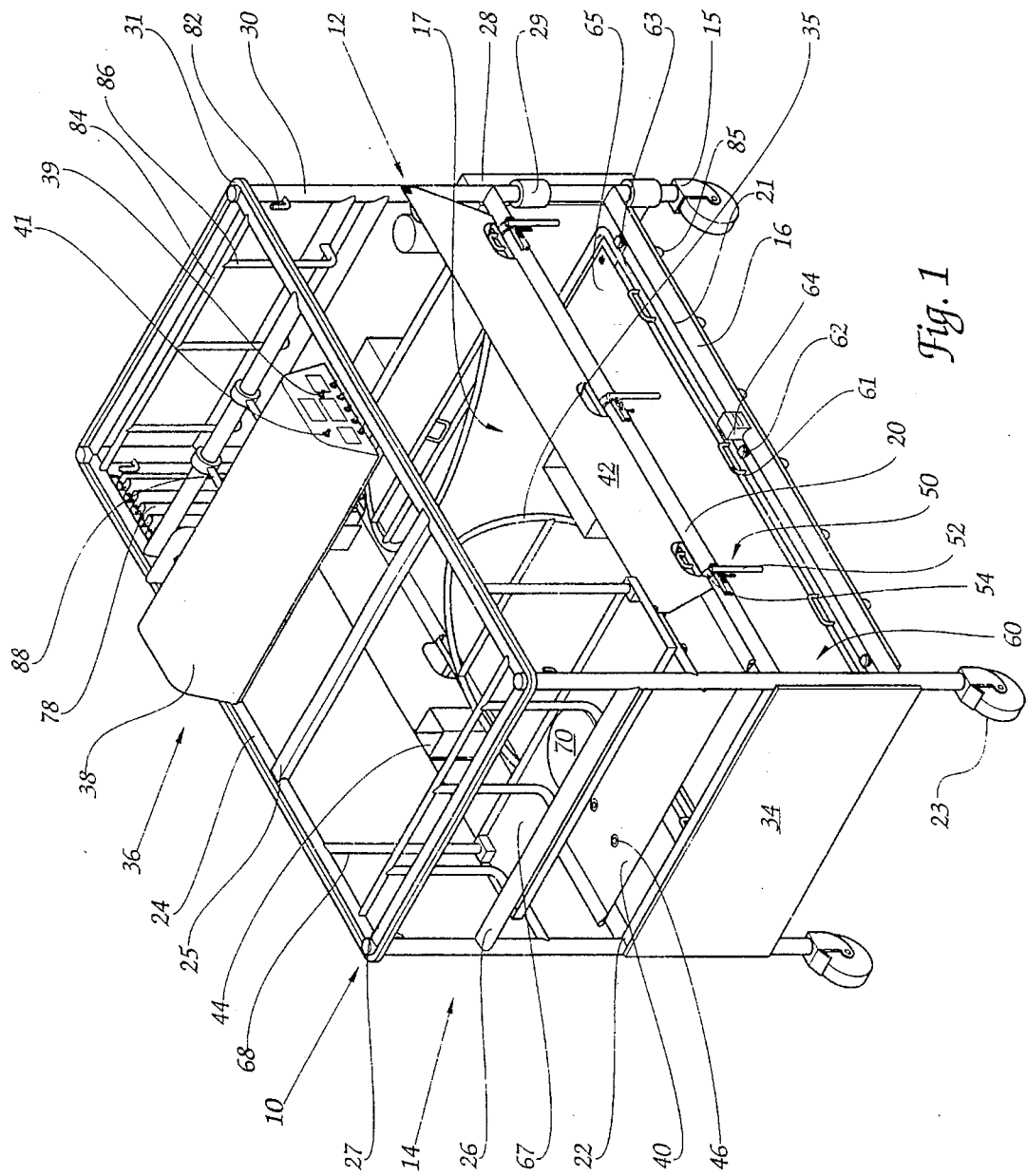
FIG. 1 is a perspective view of a patient transport and care apparatus in accordance with the preferred embodiment of the present invention.

Turning now to the accompanying drawings and, more specifically to FIG. 1, an apparatus for patient transport and care is illustrated generally at 10 and includes a generally rectangular, skeletal frame structure 12 having a superstructure 14 formed integrally therewith and projecting upwardly therefrom. The mid-portion of the interior of the frame structure 12 defines a patient support area 17 and the superstructure projects upwardly from this area. The frame structure 12 itself includes four vertical support members 30 positioned at the outer corners of the frame structure 12 and each vertical support member 30 is linked to the other vertical supports members 30 by a pair of lower longitudinally extending cross members 16, a pair of mid-level longitudinally extending cross members 20 having the primary patient support area 17 extending therebetween and a pair of upper longitudinally extending cross members 24. The vertical cross members 30 are also linked on one end by a mid-level horizontal transversely extending cross member 22, a first upper horizontal transversely extending cross member 26 and a second upper horizontal transversely extending cross member 27 disposed adjacent the upper ends of the vertical cross members 30. A CPR back board 34 is fastened to one end of the frame structure 12 while a gate 28 is attached to the other end of the frame structure 12 using hinges 29. A curtain hook track 31 extends around the perimeter of the frame structure 12 adjacent the upper horizontal cross members 24,27. A plurality of transversely extending cross braces 25 extends between the uppermost horizontal longitudinally extending cross members 24 to provide a mount for a lifter assembly 36 as will be seen in greater detail hereinafter. A wheel assembly 15 is mounted to the lowermost portions of each of the vertical support members 30 to allow rolling movement of the apparatus 10 along a smooth surface. At least one wheel assembly 15 is provided with a brake 23 to prevent unwanted rolling movement of the apparatus 10.

Figure 6:
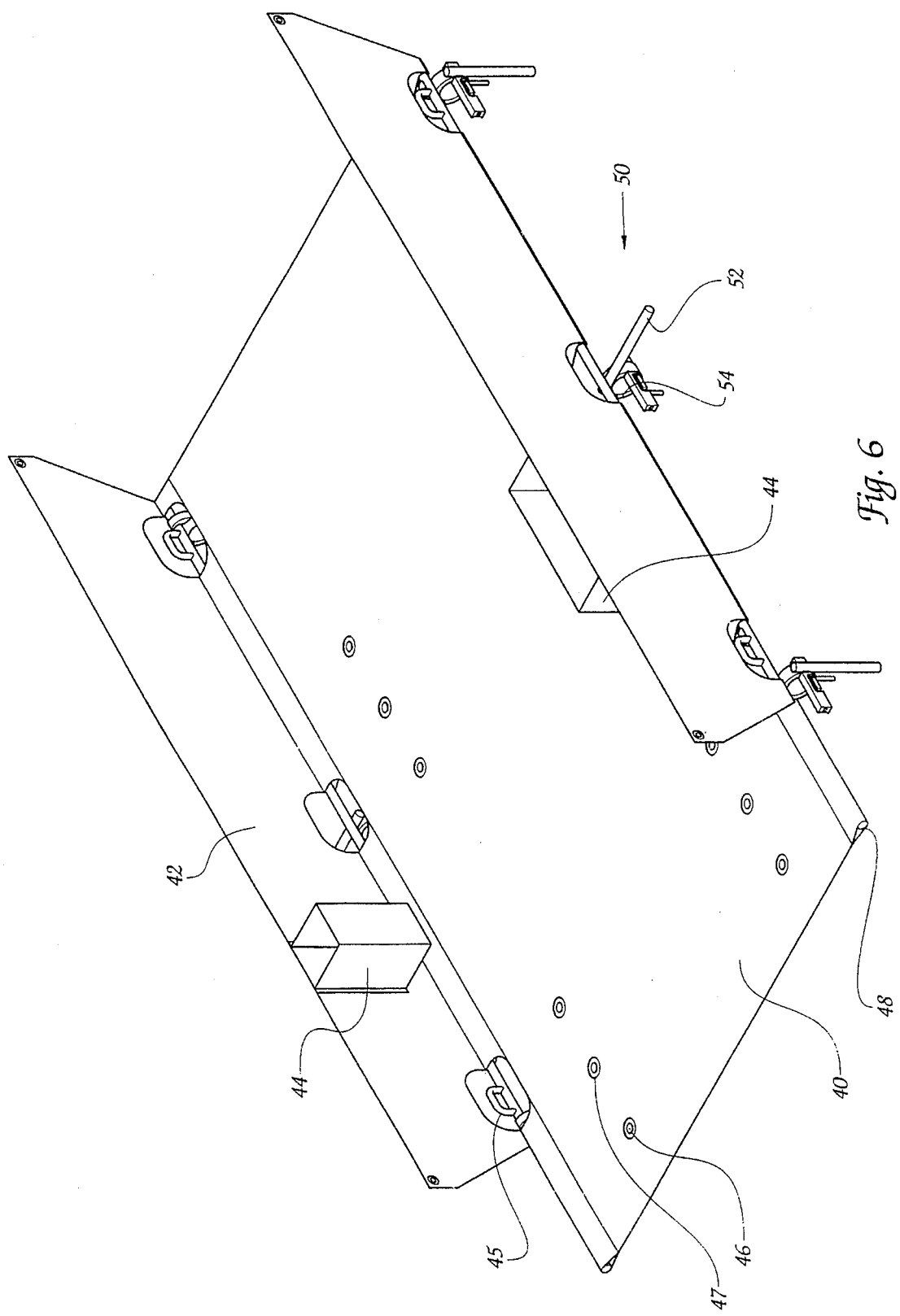
FIG. 6 is a perspective view of the patient support device associated with the patient transport and care apparatus illustrated in FIG. 1.

In order to support a patient on the apparatus 10, a flexible patient support platform 40 is provided as seen in FIGS. 1 and 6. The patient support platform 40 is formed from flexible sheet material so that it may be selectively movable transversely across the patient support area 17, or removed from the apparatus 10 altogether, as will be seen in greater detail hereinafter. Two longitudinally extending poles 48 are fitted into envelopes formed on side edges of the platform 40 and extend the full length thereof to add rigidity and support to the platform 40. Two barrier members 42 are formed as planar flexible sheets which extend upwardly from the side edges of the platform 40. Optionally, the barriers 42 may be formed integrally with the patient support platform 40. A plurality of generally C-shaped handles 45 are attached to the support poles 48 for gripping and lifting. Pockets 44 are formed on the inner surface of the barriers 42 to accommodate bed pans or other patient care accessories. Additionally, a plurality of grommeted openings 46 are provided in the support platform 40 for attachment of any necessary patient restraint devices (not shown). As will be seen throughout, the present invention is adapted to provide efficient patient transportation and care along the way.

Figure 7:
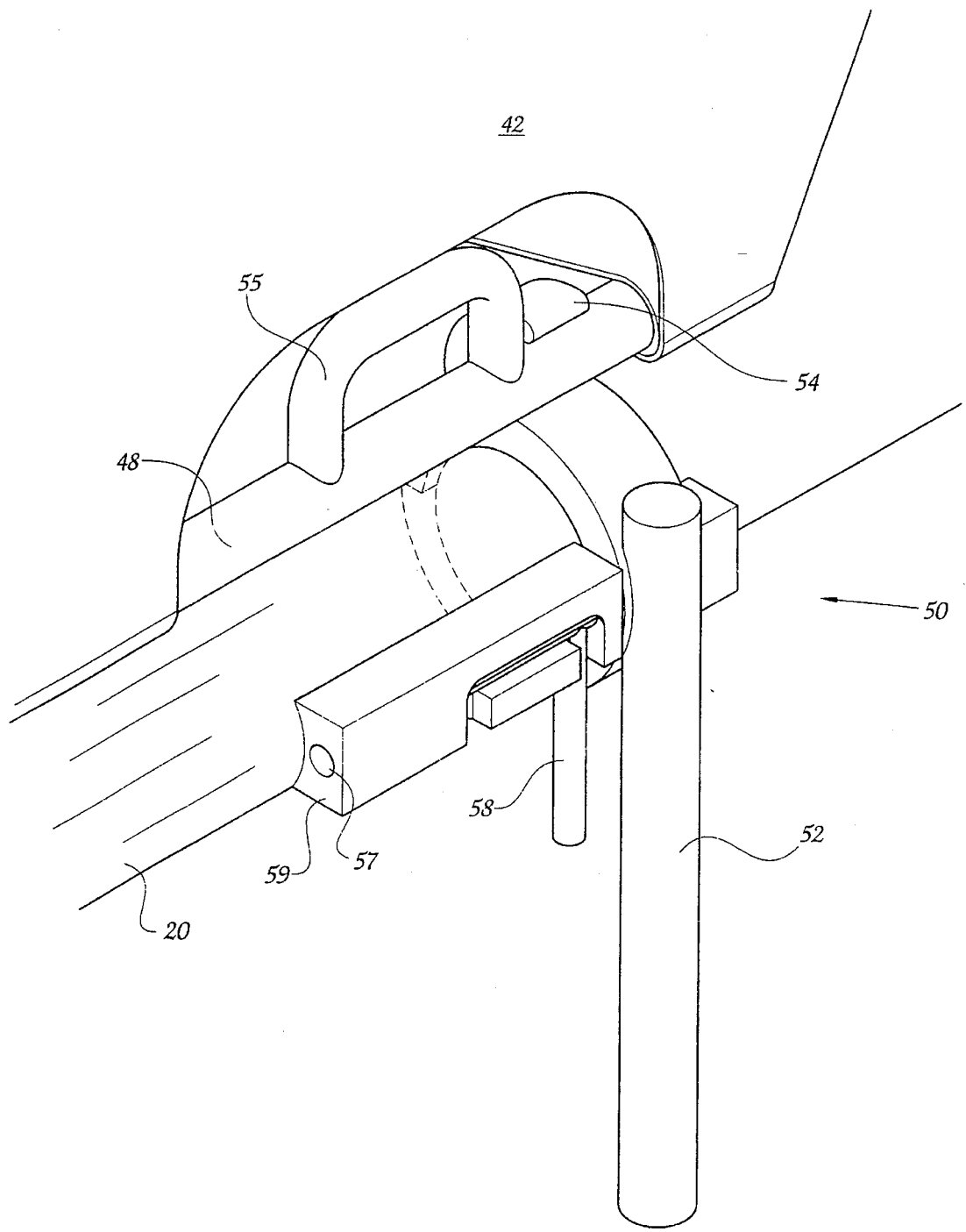
FIG. 7 is a perspective view of the latching arrangement provided to retain the patient support assembly on the patient transport and care apparatus of the present invention.
Figure 8:
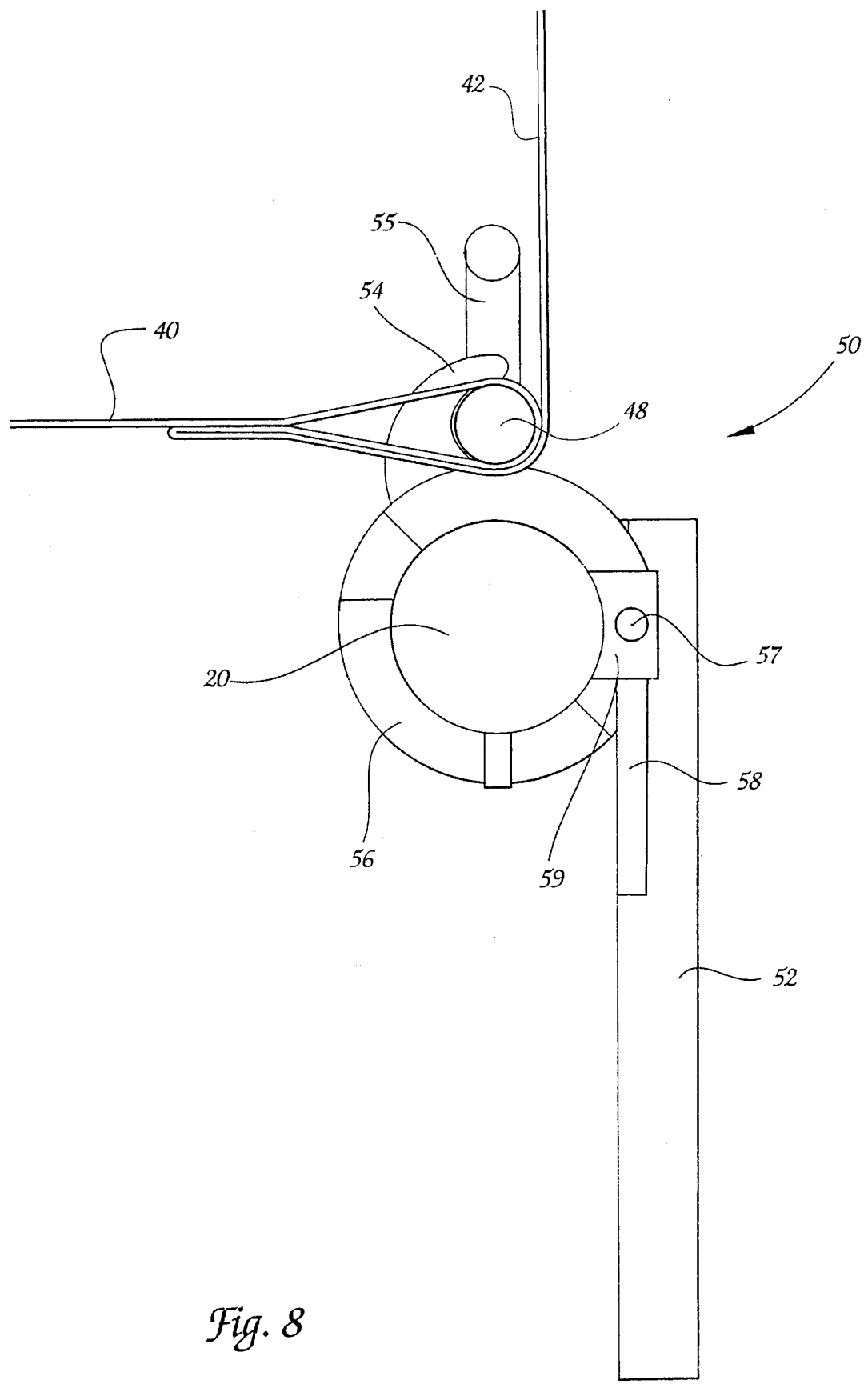
FIG. 8 is a side view of the latching assembly illustrated in FIG. 7.

In order to retain the patient support platform 40 in place, a plurality of latching assemblies 50 are provided. These assemblies are best seen in FIGS. 6, 7 and 8. There are preferably three latching assemblies 50 per side along the platform 40; however, it is contemplated that any number of the latching assemblies may be used as required by the particular application. The latching assemblies 50 include a generally circular rotator sleeve 56 which extends around the mid-level longitudinally extending horizontal cross member 20 with a generally elongate handle 52 projecting tangentially away from the rotator sleeve 56. A generally C-shaped gripping member 54 extends radially outwardly from the rotator sleeve 56 at a position approximately 100° away from the handle 52. As may be expected, manipulation of the handle 52, causing the rotator sleeve 56 to rotate on the horizontal cross member 20 to which it is mounted thereby causes movement of the gripping member 54. As best seen in FIG. 8, with the handle in a downwardly directed position the C-shaped gripping member 54 can receive the pole 48 associated with the patient support platform 40 within the cavity formed by the gripping member 54 thereby gripping the pole and, thusly, the patient support platform 40.

In order to retain the latching assembly 50 a latched configuration, a lock pin 57 is mounted to a support bracket 59 which is in turn mounted to the horizontal cross member 20 adjacent the latching assembly 50. This arrangement is best seen in FIG. 7. The support bracket 59 is a generally rectangular block having the lock pin 57 movably mounted therein. A generally elongate handle 58 extends downwardly from the lock pin and is movable between a latched position wherein the lock pin 57 extends inwardly into a corresponding opening in the rotator sleeve 56 which is placed in registry with the opening in the mounting member 59 to receive the lock pin 57.

By placing the platform support pole 48 on the rotator sleeve 56, then pushing downwardly on the latching handle 52, the gripping member 54 engages the platform pole 48 with the opening (not shown) in the latching assembly coming into registry with the opening in the mounting bracket 59 to receive the lock pin 57 upon sliding movement of the lock pin handle 58. Reversal of these movements results in the release of the support platform 40 by the latching assembly 50. Accordingly, the latching assembly 50 provides a sure-fitting, quick-release latch to hold the patient support platform 40 in a patient support configuration.

Figure 4:
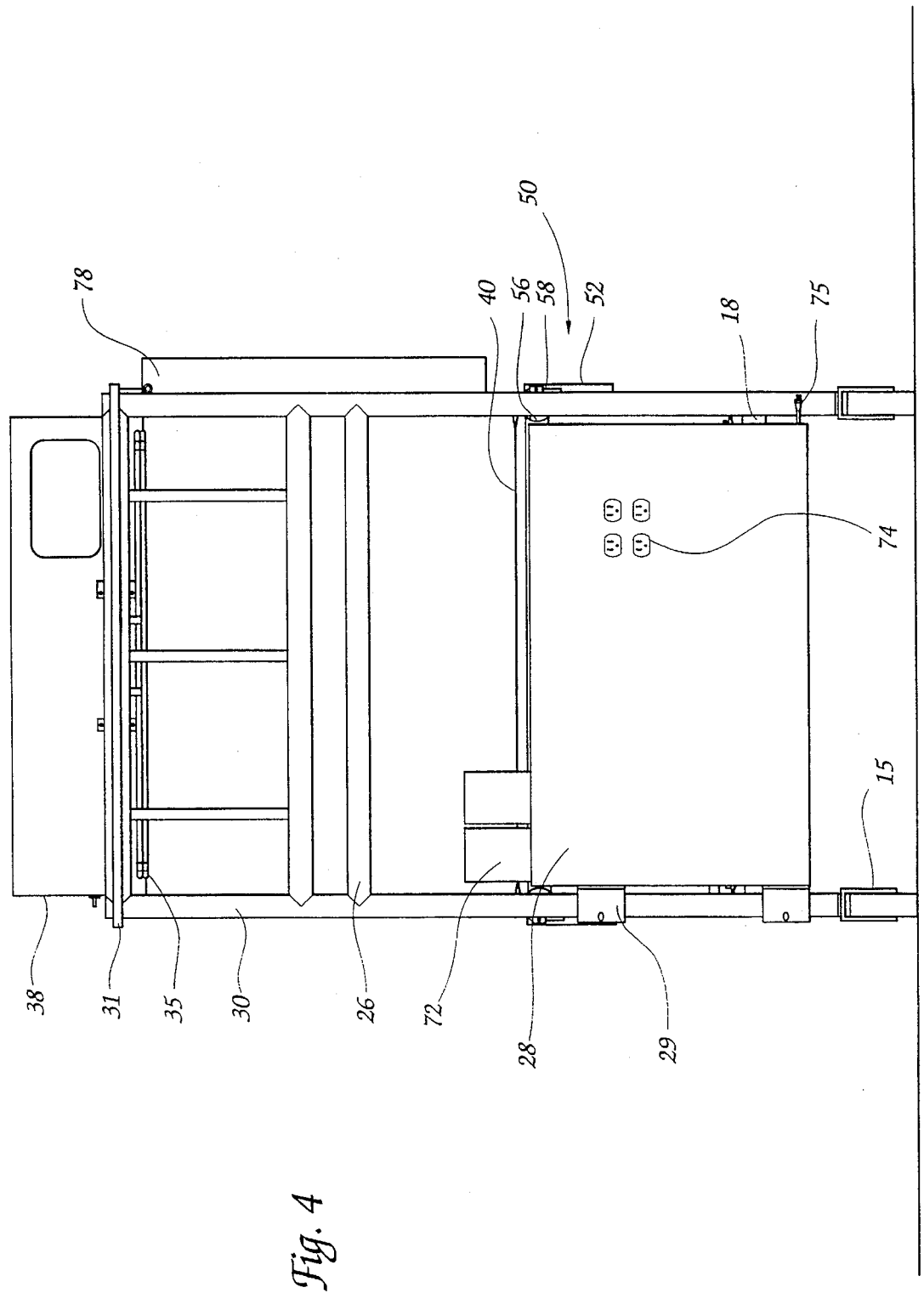
FIG. 4 is an end view of the patient transport and care apparatus illustrated in FIG. 1.
Figure 5:
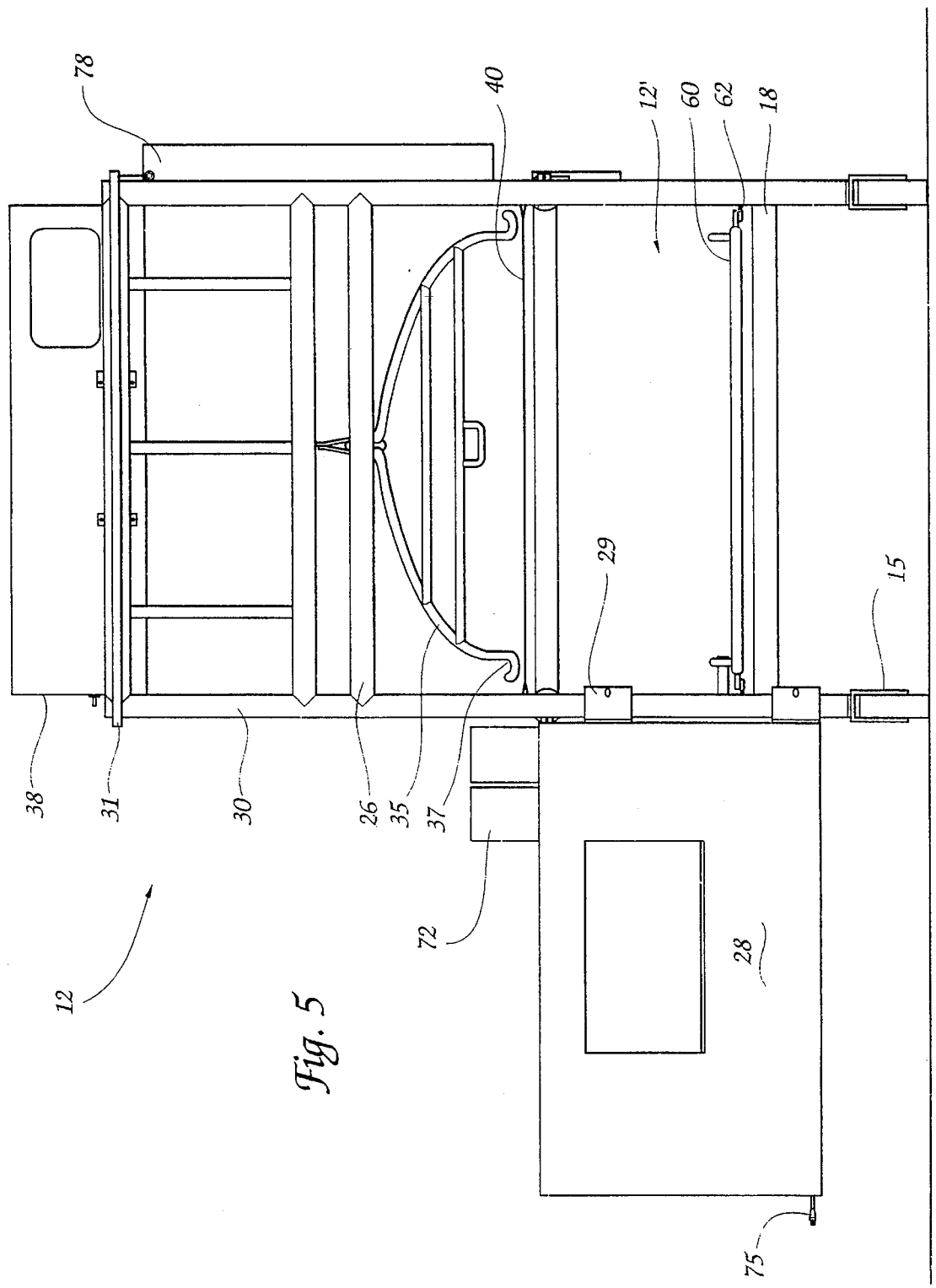
FIG. 5 is an end view of the patient transport and care apparatus illustrated in FIG. 4 with the gate open.

One of the more interesting features of the present invention is its ability to be rolled into and out of a surrounding relationship with another patient support structure such as an examining table or bed. With reference to FIGS. 4 and 5, the frame structure 12 includes an open end portion 12' and the frame structure 12 itself is sized to enter into a surrounding relationship with a typical hospital bed or examining table. A gate 28 is provided and is formed as a generally rectangular planar member mounted to a vertical support member 30 using hinges 29. As may be expected, the gate 28 may be entirely removed without departing from the spirit of the present invention. However, and as will be seen, the gate provides a useful support for other elements of the apparatus 10. As may be expected, and as will be seen in greater detail when discussing the operational aspects of the present invention, the gate 28 may be moved from a closed position as seen in FIG. 4 to an open position as seen in FIG. 5 for rolling the apparatus 10 into a surrounding relationship with the patient support structure (not shown in FIGS. 4 or 5). The gate 28 may be returned to a closed position as seen in FIG. 4 after the apparatus 10 is removed from its surrounding relationship with the patient support structure.

Figure 2:
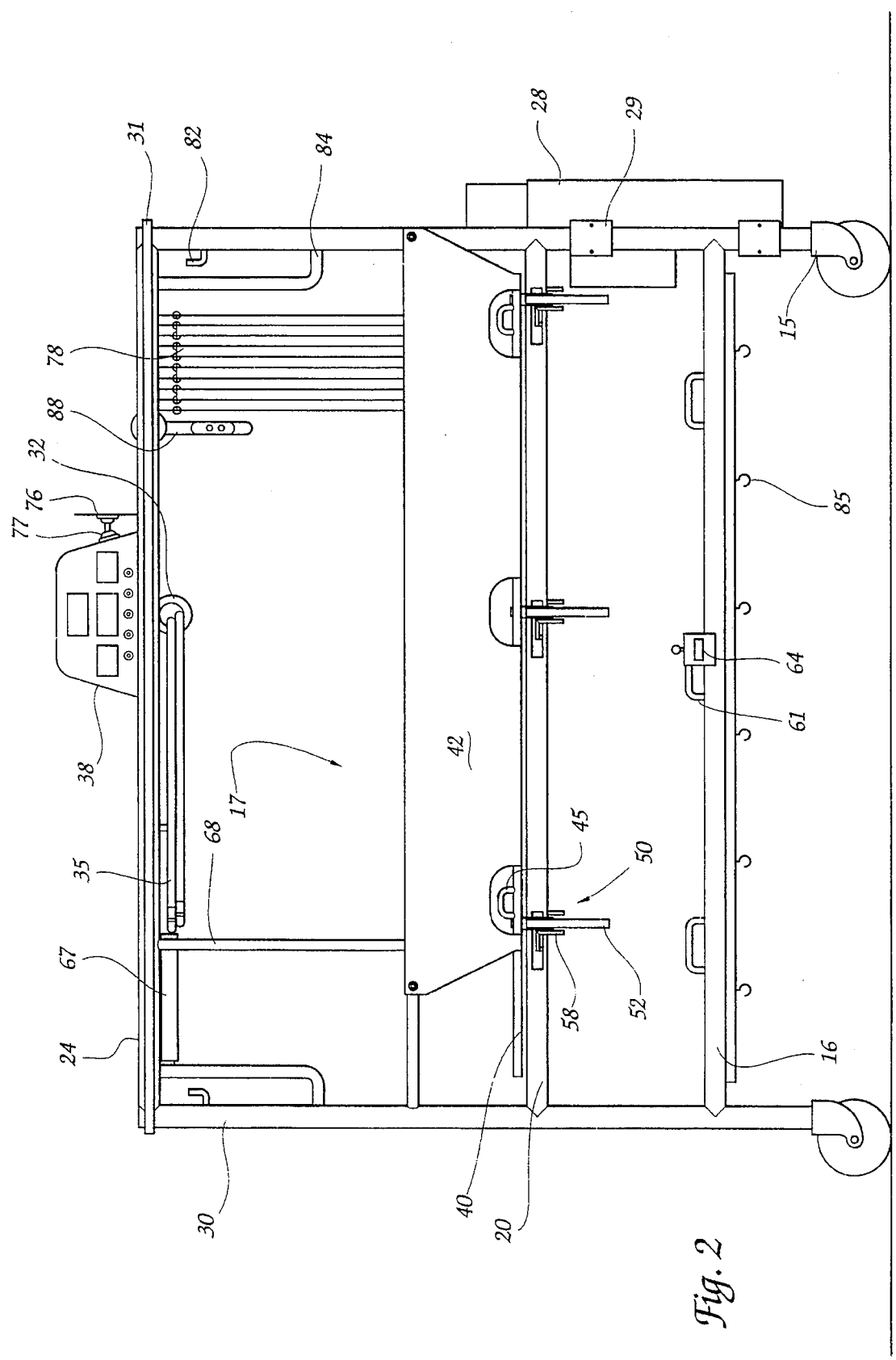
FIG. 2 is a side view of the patient transport and care apparatus illustrated in FIG. 1.
Figure 9:
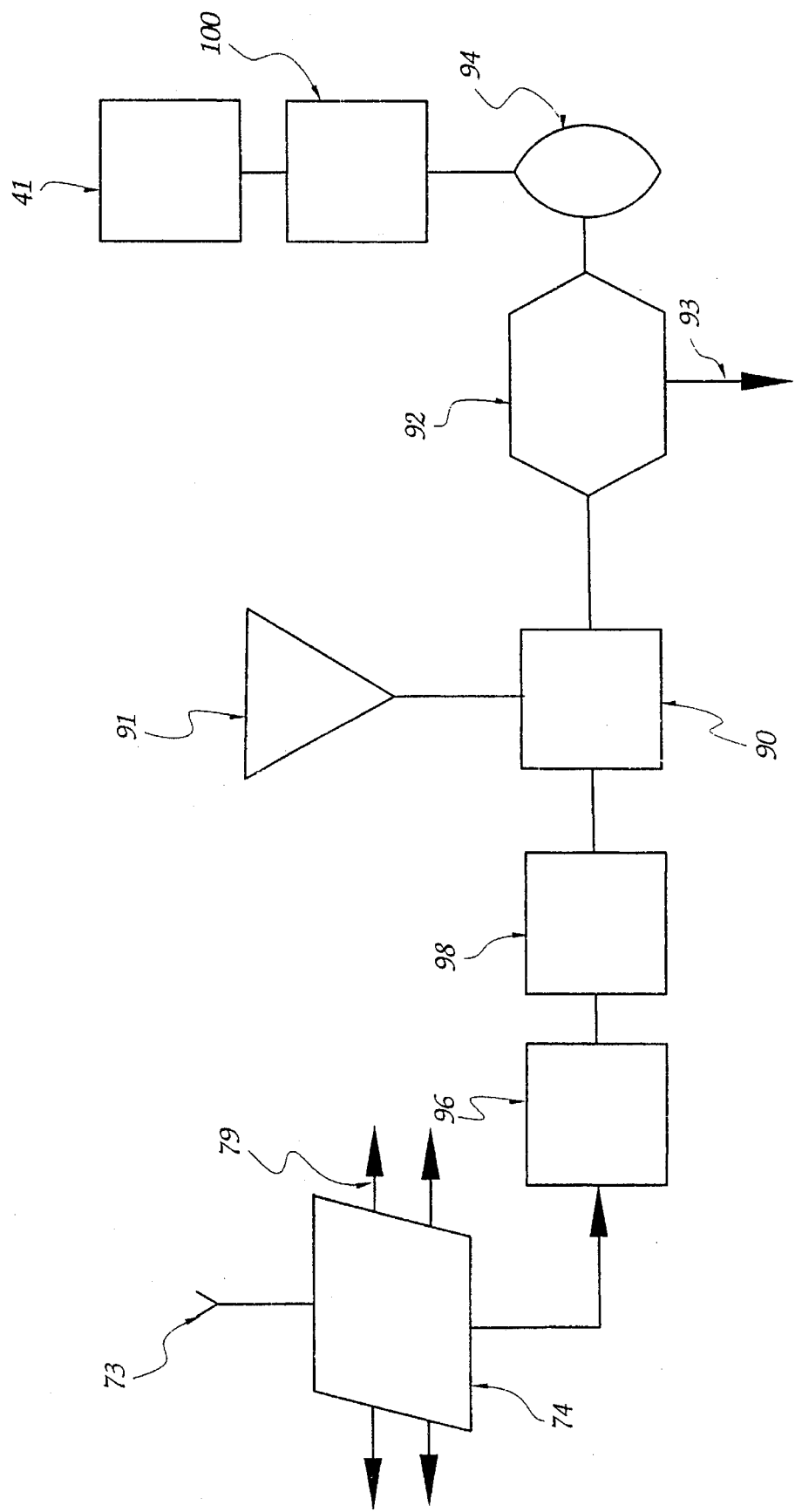
FIG. 9 is a block diagram of the control assembly associated with the lifting assembly, the charging system and the electrical distribution system of the present invention.

The present invention also includes an assembly for lifting and weighing patients. In that regard, a housing 38 is mounted to the superstructure 14 along the uppermost horizontal, transversely extending support members 25. As seen in FIG. 9, in a diagrammatic form, an electric motor 90, which is preferentially a DC motor, is mounted in the housing 38 in operational, mechanical communication with a transmission 92. As indicated at 93, mechanical power is available at a transmission output 93 which is operationally attached to a pair of bowed support braces 35 which are suspended by a support ring 32 from the superstructure, as best seen in FIG. 2. The support braces 35 have a hook 37 formed at each end thereof. The hook 37 is configured to engage and be retained by handles 55 formed on the patient support platform 40. The hooks 37 are selectively attachable to and detachable from the handles 55. As will be seen, when the hooks 37 are attached to the handles 55, the latch assembly 50 may be moved into a delatching position and the patient support platform 40 will then be supported by the support braces 35. Using conventional motor controls 91, as indicated in FIG. 9, the motor 90 may be selectively activated to raise or lower the support braces and, accordingly, the patient platform 40. The transmission 92 allows the use of a lower powered motor than would be required if the lifting mechanism were directly driven. With continued reference to FIG. 9, load cell 94 is operationally connected to the transmission 92 to receive and monitor the downwardly directed force caused by any weight on the platform 40 and emit an electrical signal proportional to that force. The electrical signal is processed by conventional circuitry 100 and its output displayed on conventional indicators 41. As best seen in FIG. 1, the indicators 41 are mounted to the housing 38 and are provided to display the electrical signal proportional to force measurement as a weight. Conveniently, control switches 39 are provided adjacent the indicators 41 to selectively operate the control circuit 41 and, thusly, the electric motor 90.

As seen in FIG. 9, the motor 90 is a DC motor so that the motor may be operational under the influence of a battery 98 rather than requiring an AC electrical hook-up. A battery charger 96 is provided to conveniently charge the battery. With reference to FIGS. 4 and 9, an electrical distribution system 74 is enclosed in the framework of the present invention. The power input 73 illustrated in FIG. 9 is shown in FIG. 4 as an extension cord 75 which is mounted on a reel (not shown) within the gate 28 and may be plugged into a wall outlet. The aforesaid battery charger 96 may be connected to the power distribution system 74 using its own retractable power cord (not shown). Conveniently, power outputs 79, illustrated as a plurality of electrical outlets 74 in FIG. 4, are provided on the outer surface of the gate 28 which are also part of the electrical distribution system 74 of the present invention.

Figure 3:
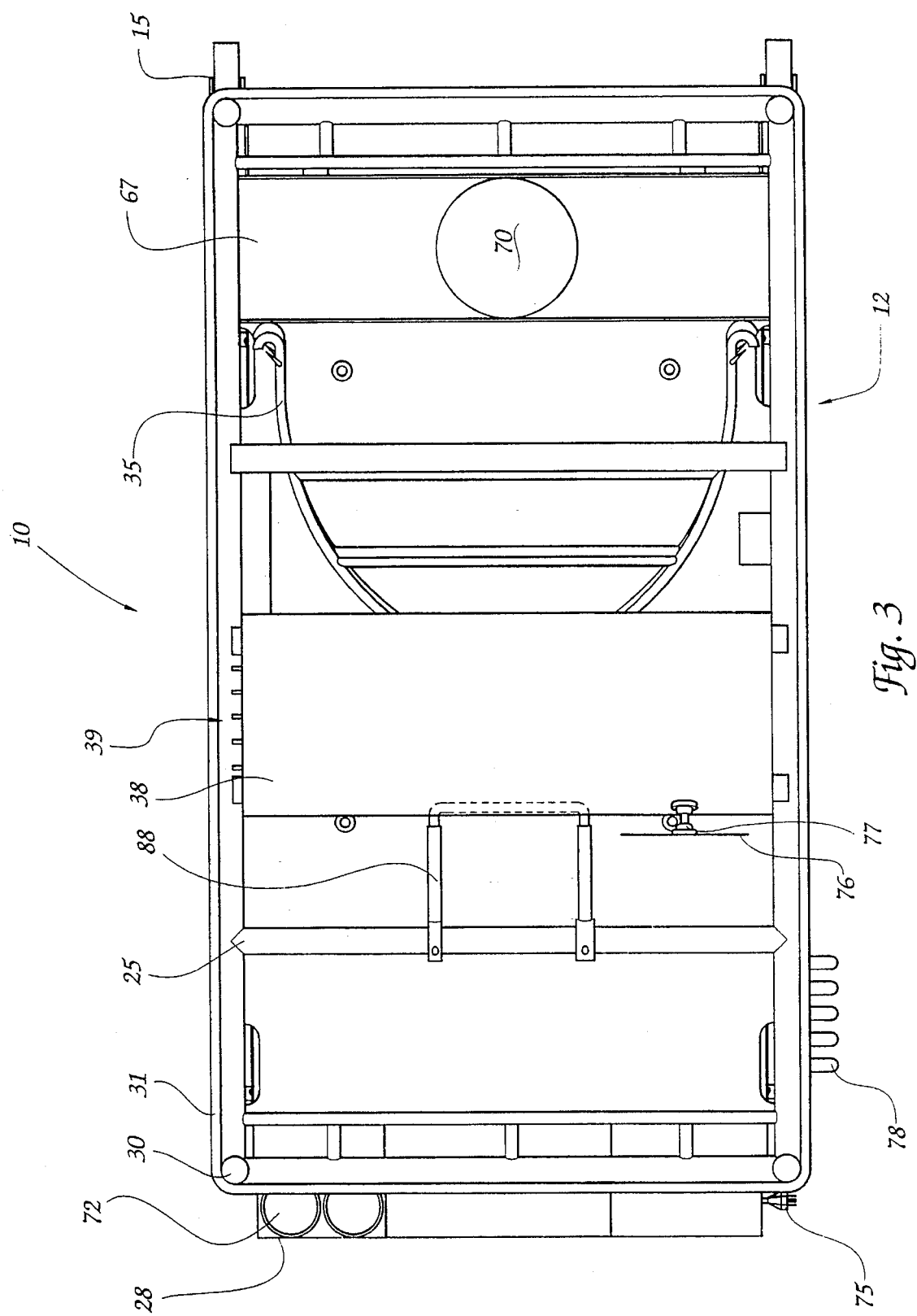
FIG. 3 is a top plan view of the patient transport and care apparatus illustrated in FIG. 1.

The present invention also includes a variety of accessories which aid in both patient transportation and patient care. Initially, and with reference to FIGS. 1, 2 and 3, a generally rectangular shelf 67 is formed as a tray and extends transversely across the width of the superstructure 14 and is slidably mounted to posts 68 which are in turn mounted to the superstructure 14. A turntable 70 is positioned within the shelf. The shelf 67 is movable between a stowage position as illustrated in FIG. 2 and a usage position as illustrated in FIG. 1. As may be expected, the shelf 67 may be fixed in the stowage position using a spring-biased pin (not shown). Both the shelf 67 and the turntable 70 provide storage for medical equipment. Additional support structures are provided to hold various equipment. Adjacent the shelf 67 and on the opposite end of the apparatus 10 from the shelf 67, a horizontal support bar 84 extends transversely across the width of the superstructure 14 and a plurality of J-shaped members 86 projects downwardly from the support bar 84 into attachment with the first upper horizontal transversely extending cross member 26. The shelf 67 is designed to support a portable cardiac monitor (not shown) and the monitor display itself may be placed on the turntable 70 for easy movement into viewing range of a care giver.

As best seen in FIGS. 1 and 2, a trapeze 88 is formed as a U-shaped member, pivotably mounted to the transversely extending cross brace 25 nearest the patient's head. It is movable between a stowed position and a use position. Additionally, and as seen in FIG. 2, a patient image reflector 76 is mounted to the housing 38 with a ball and socket bracket 77 to allow the attendant to adjust the mirror to view a patient's condition.

Hooks 82 are mounted to the vertical support members 30 to support IV bags or miscellaneous equipment. A privacy curtain 78 is mounted to the upper support members 24,27 to provide selective privacy for a patient. Other items which may be transported on the device include the patient records, intravenous pumps and fluids, an oxygen tank 72 and associated tubing, blood pressure monitor, cardiac monitor and defibrillator, CPR backboard, respiratory therapy kit, ventilator, emergency medication and equipment, as well as the patient's personal belongings and personal medications. A plurality of hooks 85 are disposed around the lower perimeter of the frame structure 12 to support drainage bags at a level below that at which the patient is supported, as best seen in FIG. 2. However, under normal conditions, the device will not be required to support every item on the list at once. Further, the list should not be construed as limiting the present invention in any way but by merely suggesting possible uses for and thereby illustrating the advantages of the present invention over the state of the art.

With reference to FIG. 1, a second patient platform 60 may be used when circumstances require the simultaneous transportation of more than one patient. Optionally, the second patient platform 60 could be used to hold equipment. The second patient support platform 60 includes a perimeterial rail member 63 having a plurality of generally C-shaped handles 61 projecting upwardly therefrom. A patient support surface 65, formed from flexible sheet material, extends within the boundaries of and is mounted to the perimeter rail 63. A plurality of wheels 62 project outwardly from the rail 63 and are configured to engage a track 21 formed in the lower horizontal transversely extending cross member 20. A latching mechanism 64 engages and retains one of the handles 61. By moving the wheels 62 along the track 21, the second patient support platform 60 may be moved into and out of a spaced vertical relationship with the first patient platform 40.

Figure 10:
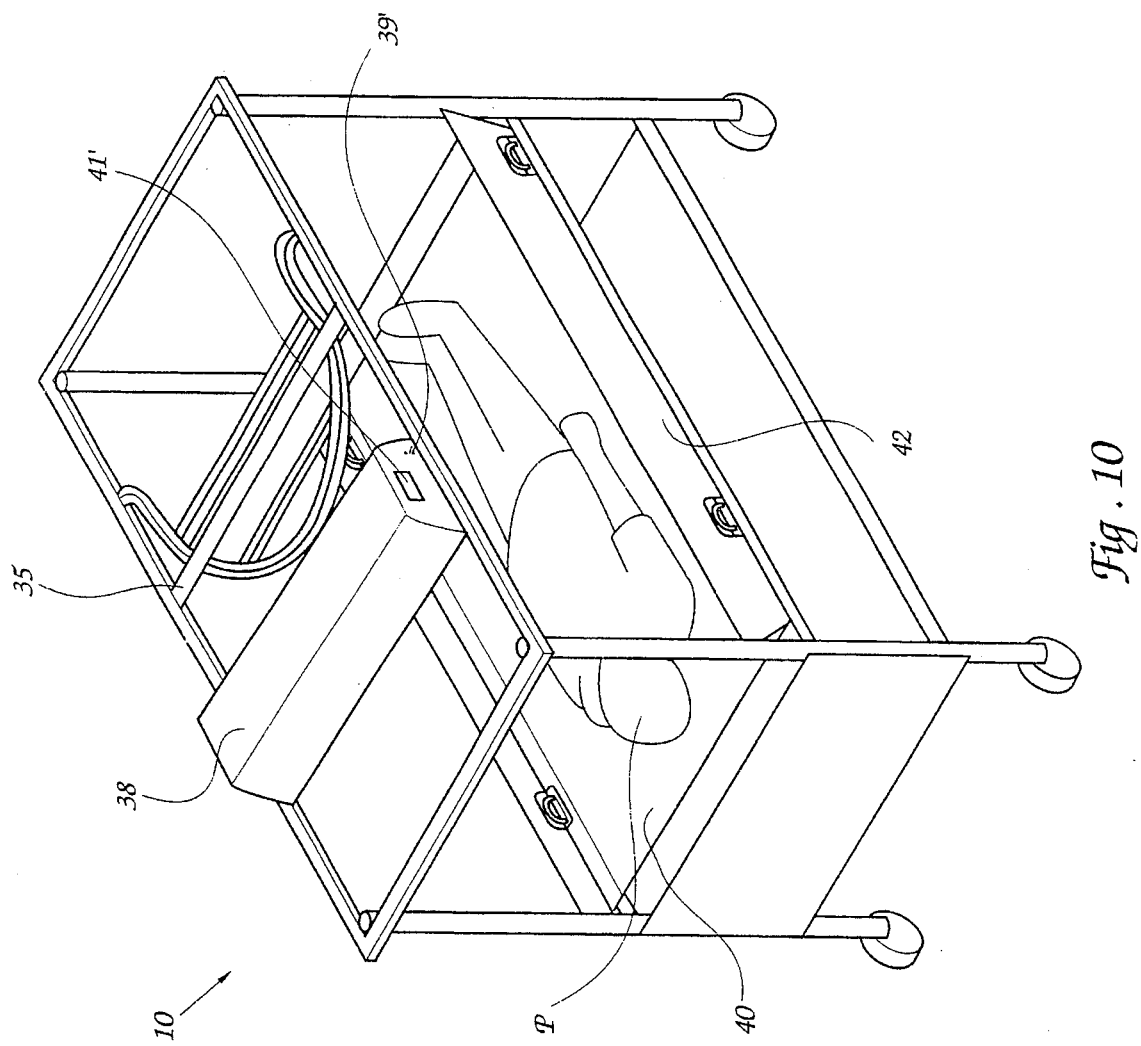
FIGS. 10–12 are perspective sequential views of a patient weighing operation using the patient transport and care apparatus of the present invention.
Figure 11:
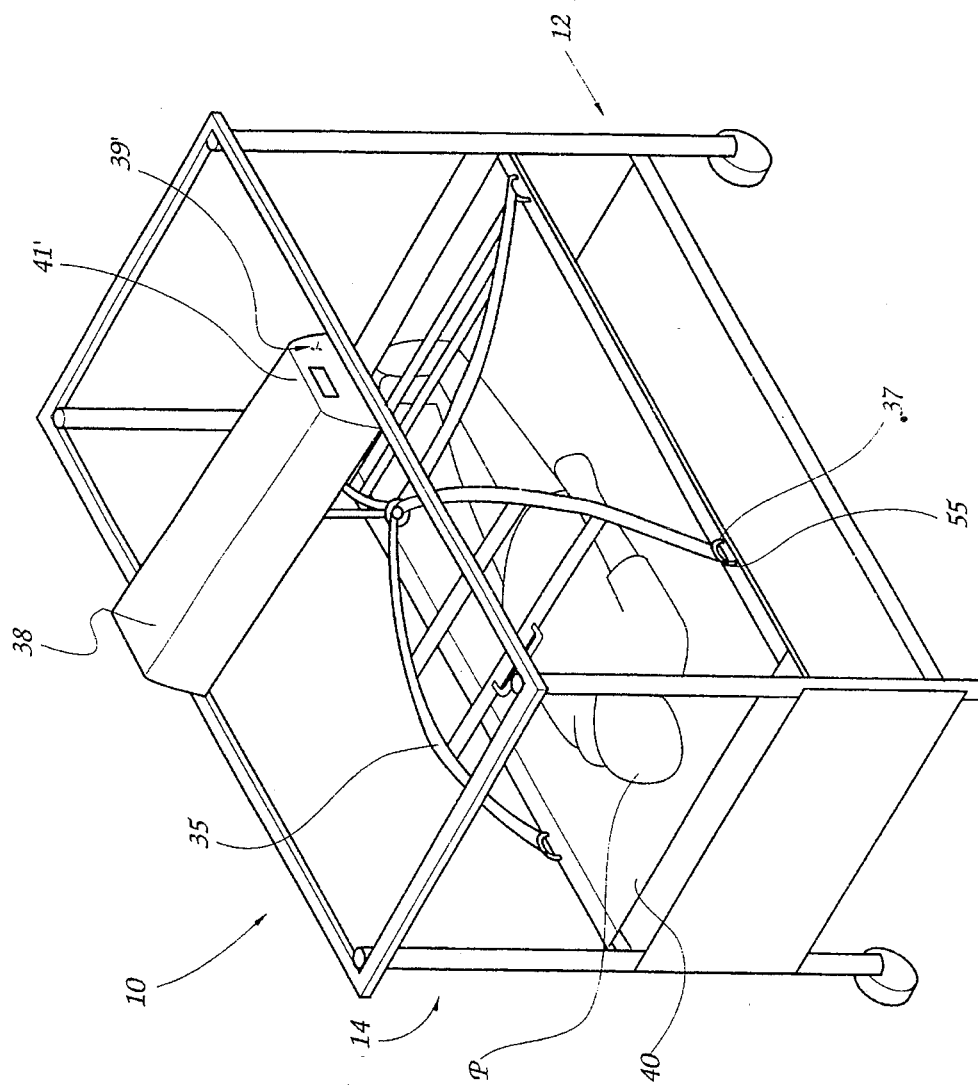
Figure 12:
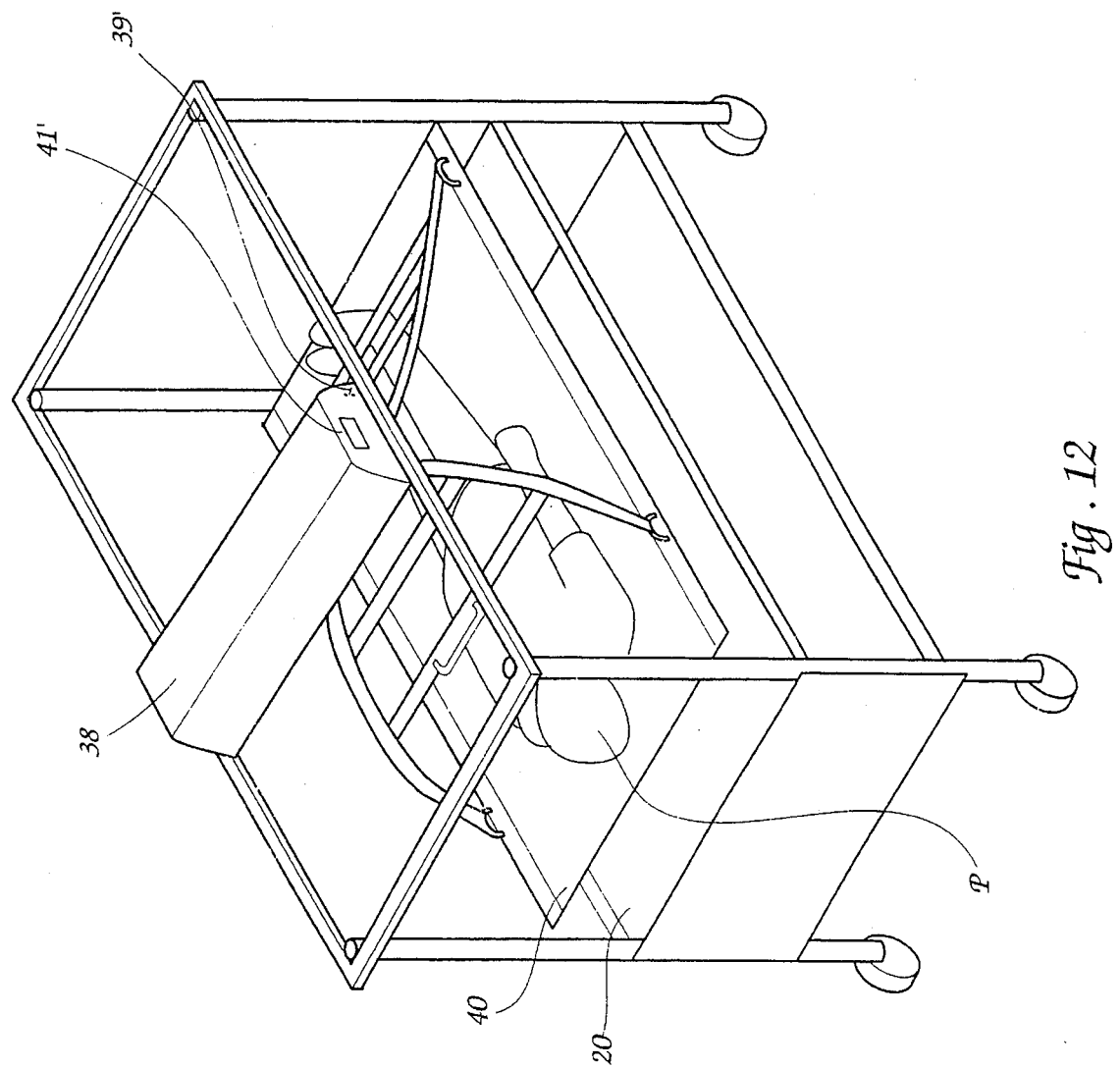

Operation of the device will now be discussed. Initially, the measurement of a patient's weight is illustrated in FIGS. 10, 11 and 12. There, with initial reference to FIG. 10, a patient P is in place on the patient support platform 40. FIG. 10 illustrates a normal transport condition. At this point it should be noted that many details of the invention are omitted in FIGS. 10–25. This should not be construed as limiting the scope of the present invention in any way and the details are merely omitted for clarity. As seen in FIG. 11, the support braces 35 are lowered into a position wherein the hooks 37 associated with each brace are engaged with the handles 55 associated with the patient support platform 40 at one end corner per hook 37. The latches, omitted in FIG. 11, are released and the patient support platform 40 is thereby suspended by the support braces 35 which are operationally engaged with the load cell 94, as indicated in FIG. 9. A motor switch 39' is moved into an "on" position and the motor 90 causes the patient support platform 40 to lift beyond the mid-level horizontal longitudinally extending cross members 20 and, when the patient P is supported by only the lifting mechanism, the patient's weight may be read from a meter 41' displayed in the housing 38.

Figure 13:
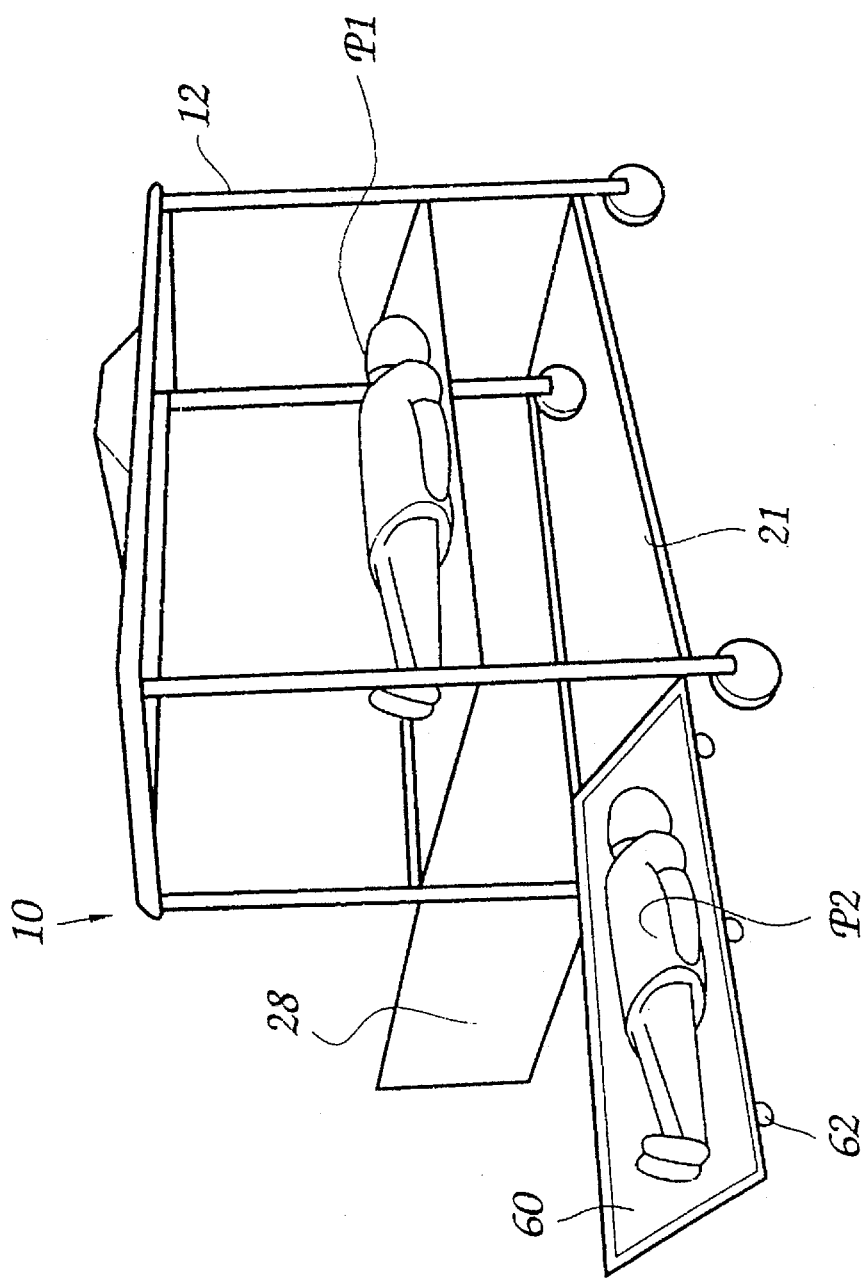
FIGS. 13–15 are perspective sequential views illustrating the placement of a second patient on the patient support device associated with the present invention.
Figure 14:
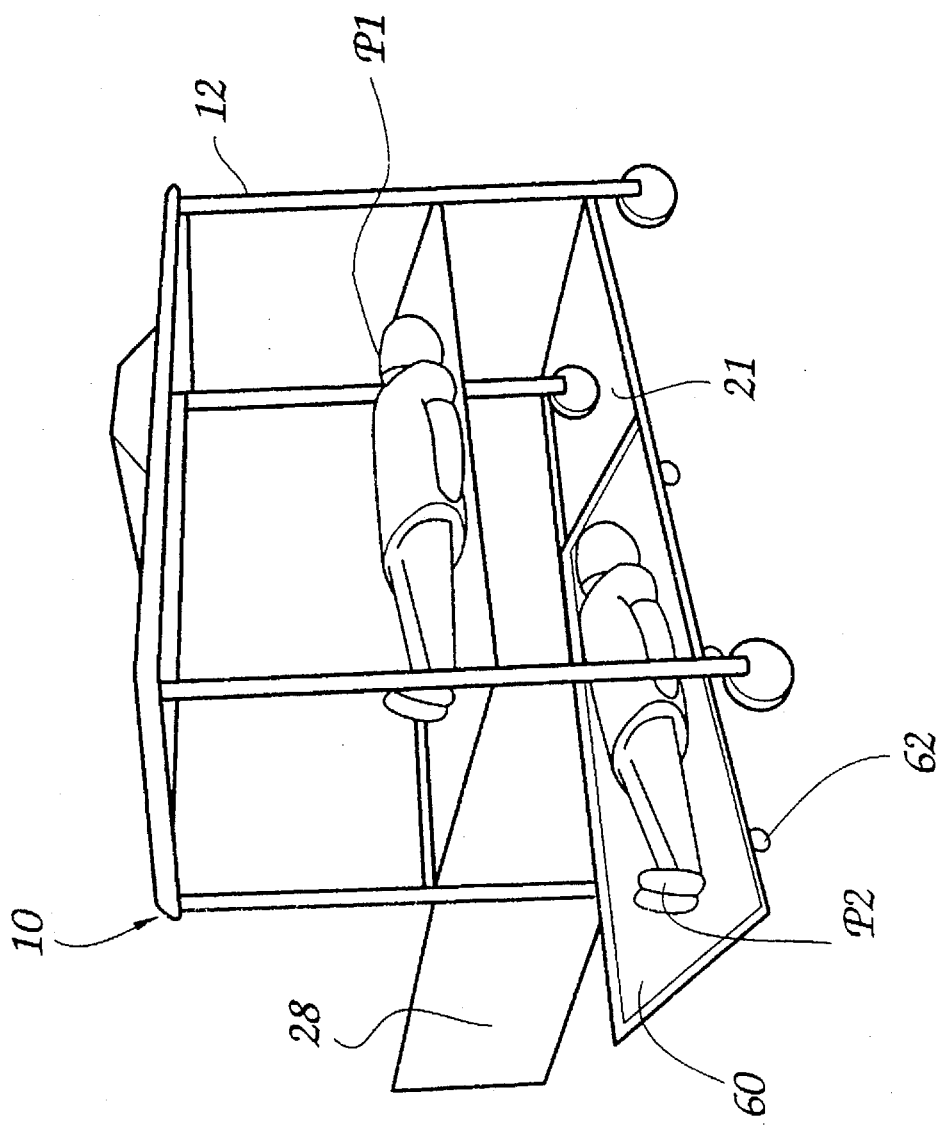
Figure 15:
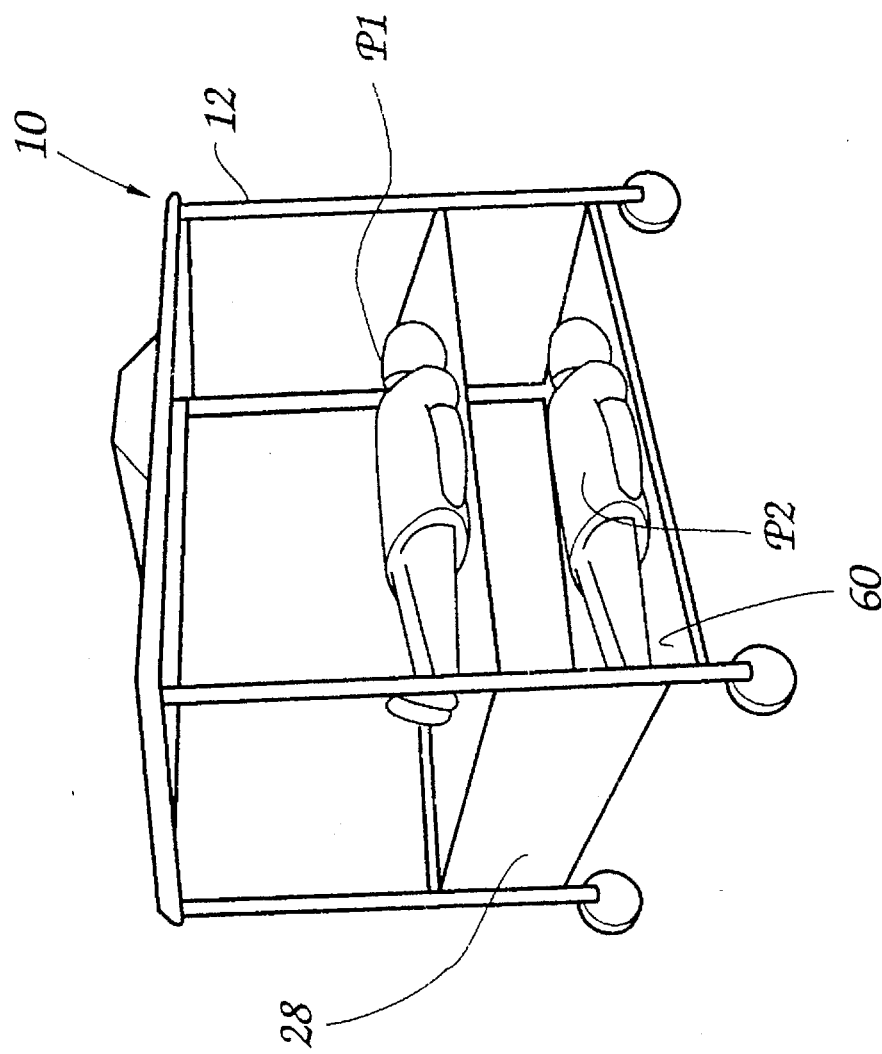

FIGS. 13–15 present a diagrammatical representation of the placement of a patient P, carried on the second platform 60, onto the apparatus 10 of the present invention. Initially, and with reference to FIG. 13, the gate 28 is opened and, with reference to FIG. 14, the apparatus 10 is rolled into a surrounding relationship with the second patient support platform 60 carrying the patient P. The wheels 62 associated with the second patient support platform 60 are mated with the track 21 and the second patient support platform 60 is wheeled into place as seen in FIGS. 14 and 15. The gate 28 is then closed and the device may be rolled along the floor with the patient P shown in the second patient support platform 60 as seen in FIG. 16.

Figure 16:
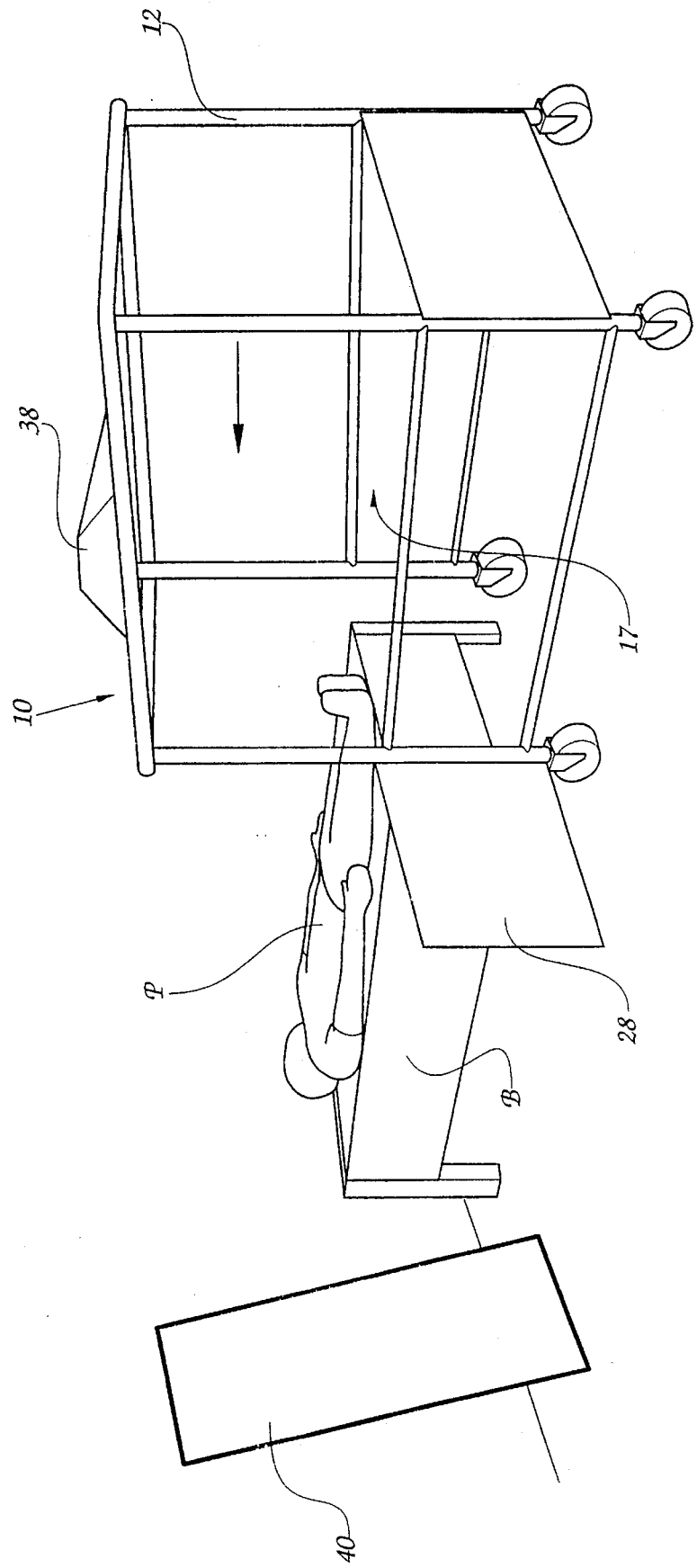
FIGS. 16–19 are perspective sequential views illustrating a second method of placing a patient on the patient support device associated with the present invention.
Figure 17:
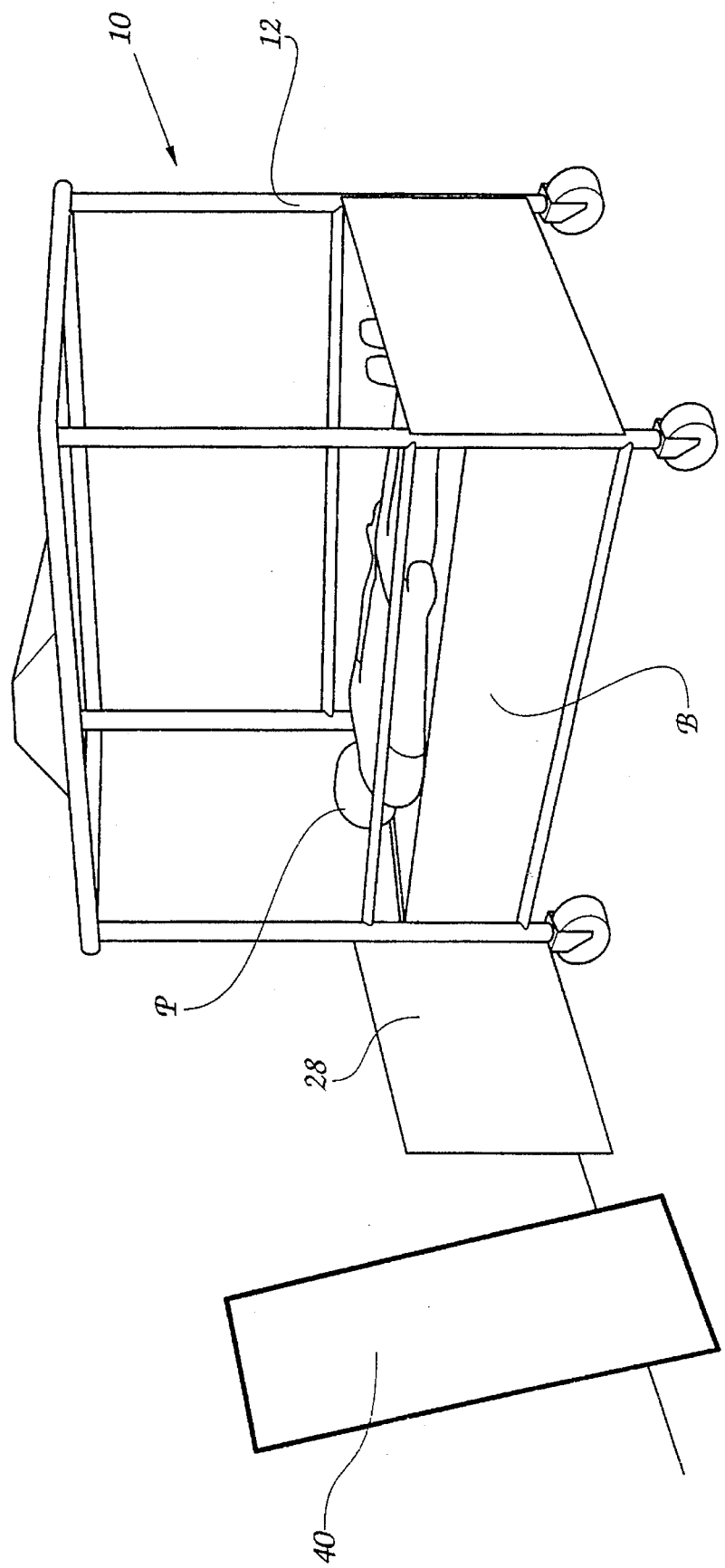
Figure 18:
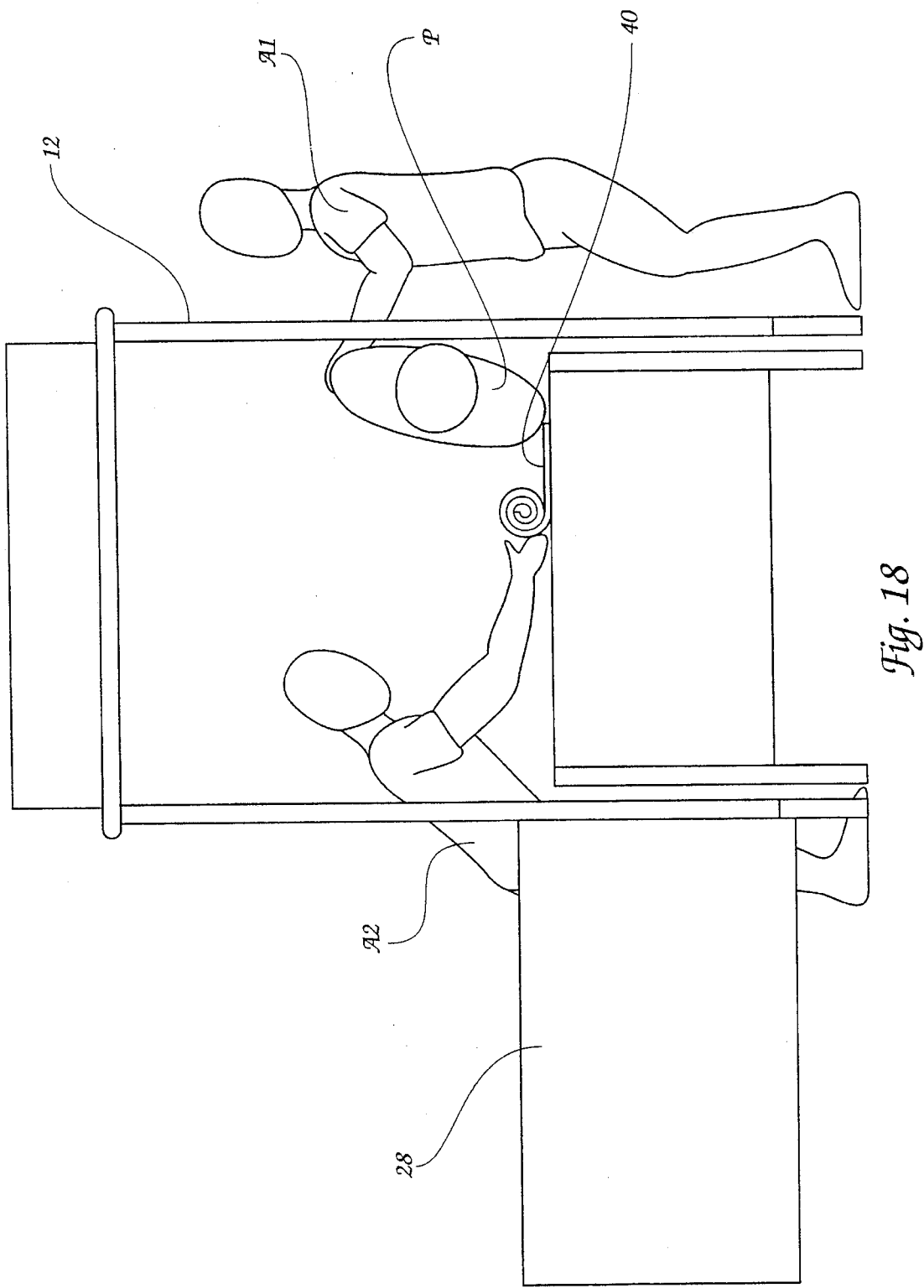
Figure 19:
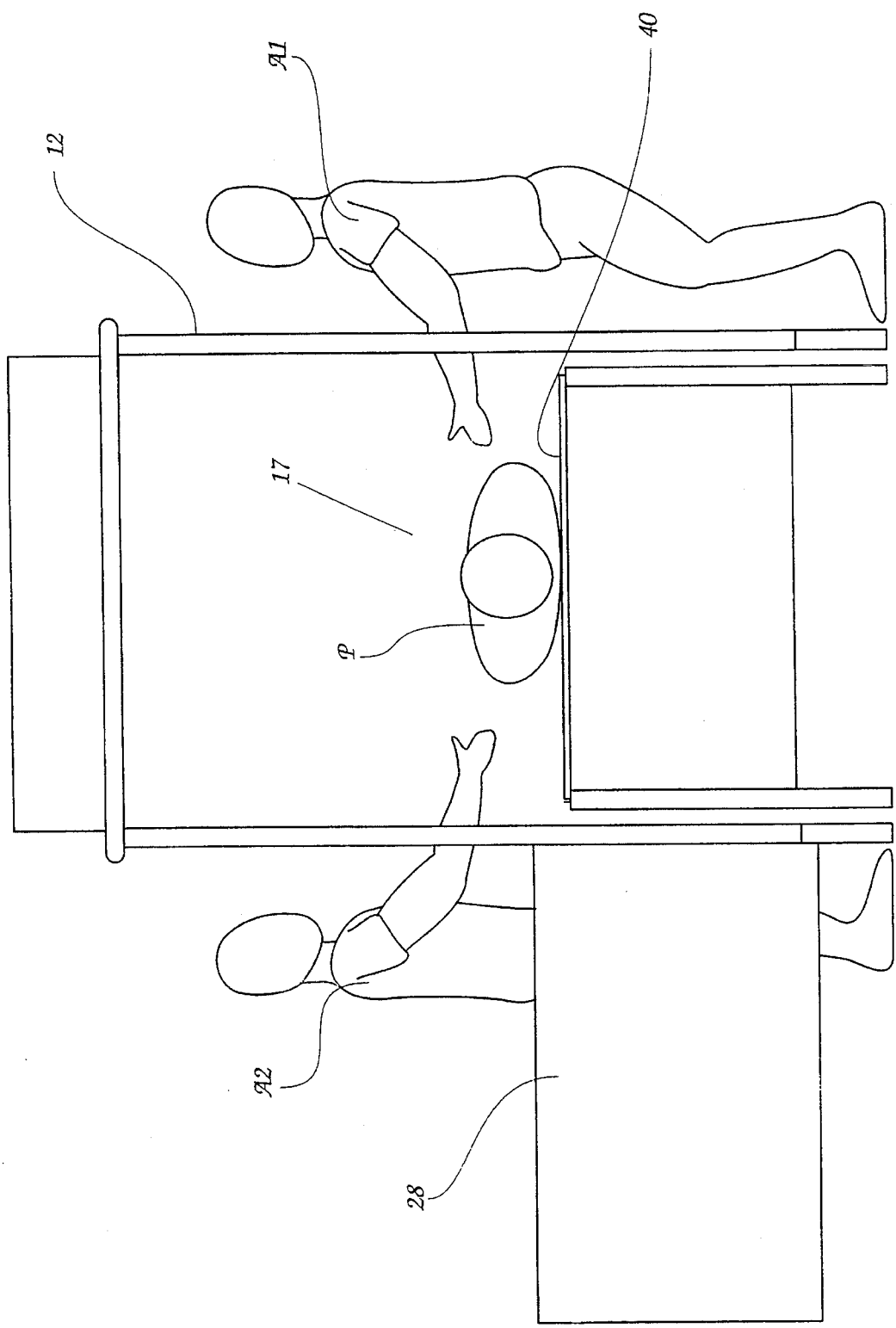

The present invention may also be used to transport a patient originally on a conventional hospital bed B, as seen in FIG. 16. As seen in FIG. 16, the gate 28 is opened and the apparatus 10 is aligned with the bed B with the foot portion of the bed B adjacent the open end portion of the apparatus 10. The patient support platform 40 is illustrated as being removed entirely from the apparatus 10. It may also remain attached along one side thereof, as previously described. As seen in FIG. 17, the apparatus 10 is rolled into a surrounding relationship with the bed B. As seen in FIG. 18, the patient P is turned by a first attendant A1 onto his side while a second attendant A2 unrolls the flexible patient support platform 40 and attaches the unattached side portion to the apparatus using the latching assemblies 50 as previously discussed. With reference to FIG. 19, the first attendant A1 then rolls the patient P onto his back onto the patient support platform 40 which is by then securely attached on both sides of the transport apparatus 10. The apparatus may then be rolled away from the bed B, the gate 28 closed and the patient transported wherever he needs to go.

Figure 20:
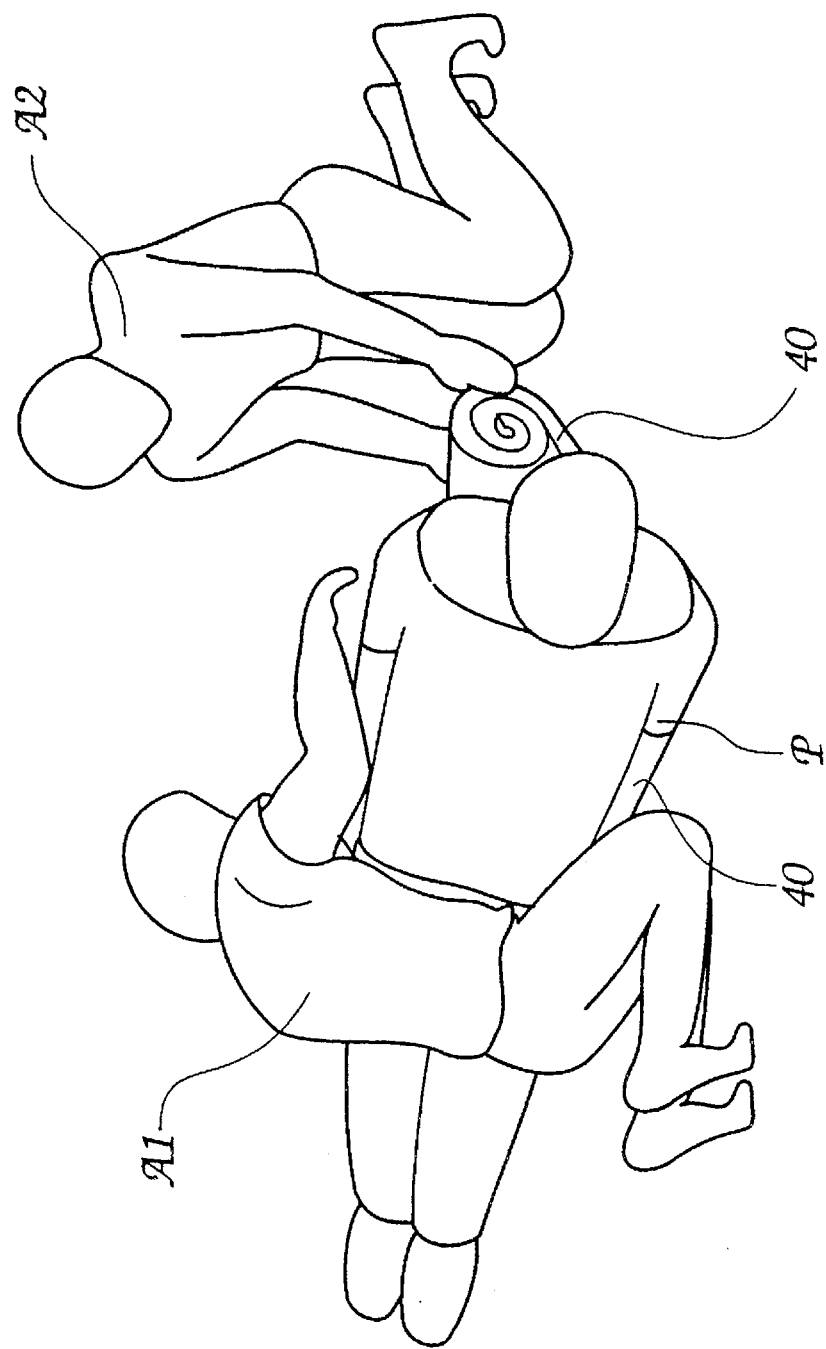
FIGS. 20–23 are perspective sequential views illustrating the technique of lifting a patient from the floor using the patient transport and care apparatus illustrated in FIG. 1.
Figure 21:
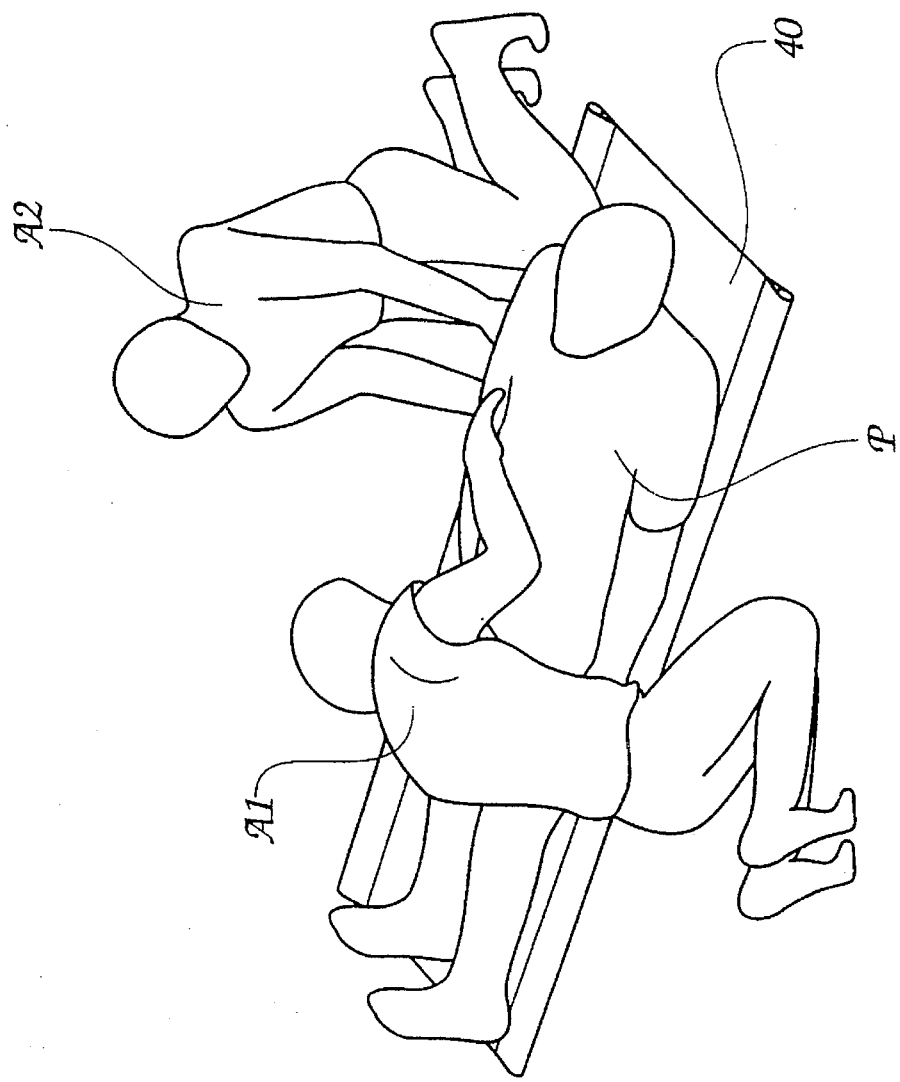
Figure 22:
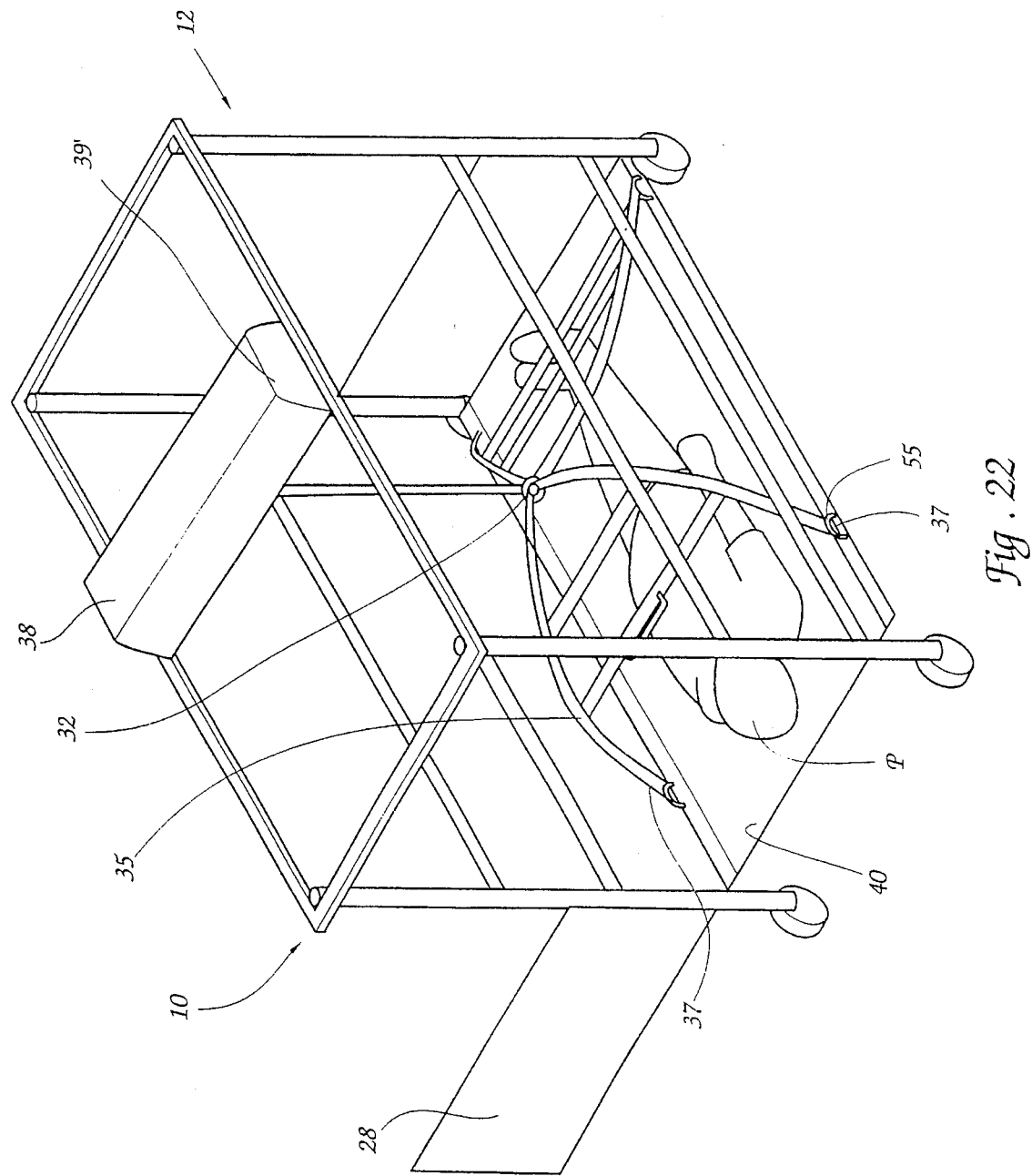
Figure 23:
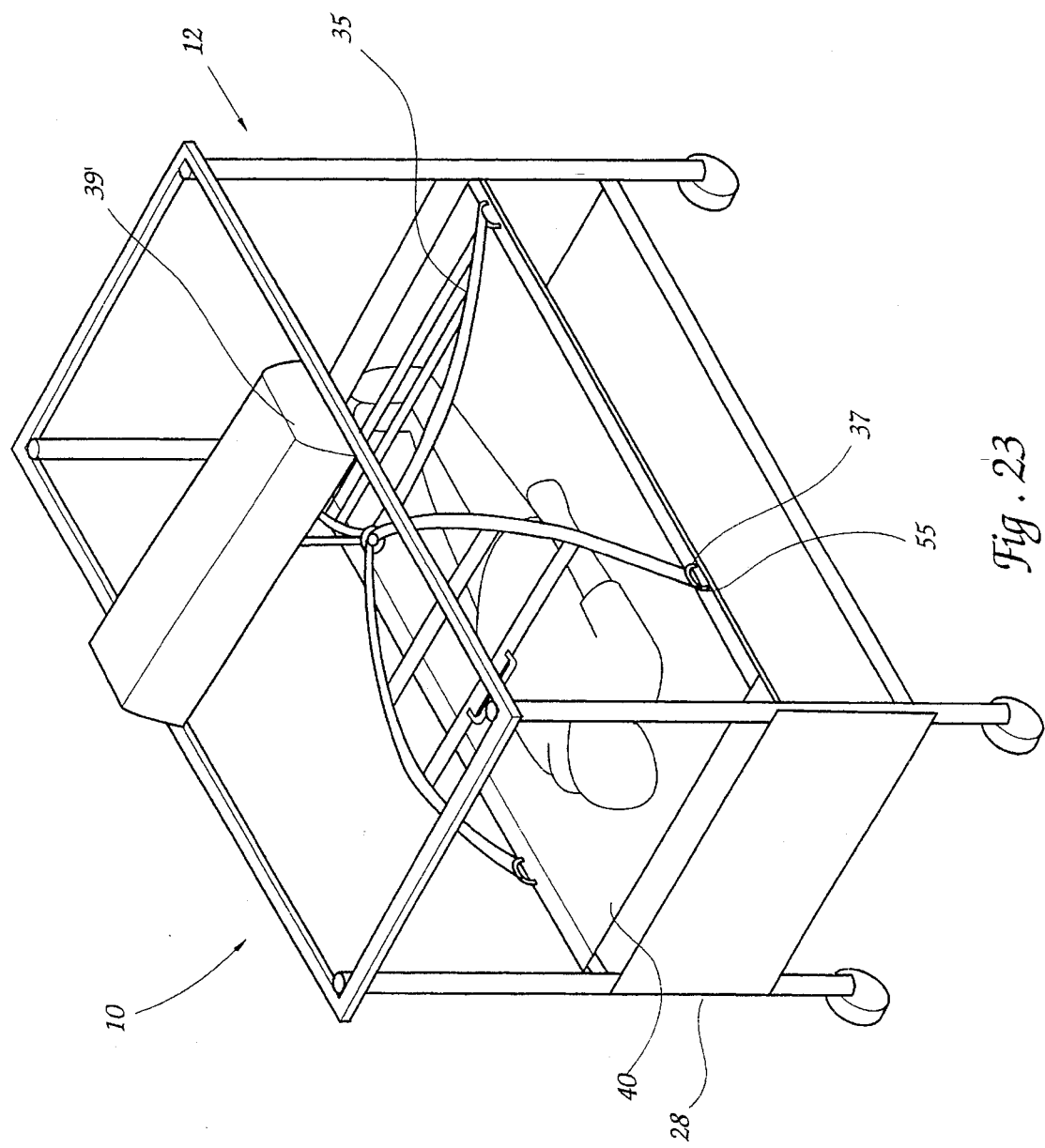

A patient may also be lifted directly from the floor by the device as illustrated in FIGS. 20–23. In FIG. 20, the attendants A1,A2 have removed the patient support platform 40 from the apparatus 10, a portion of which 40' is placed under the patient P, the remainder of the support platform 40 is unrolled and the patient rolled backwardly onto the support platform 40. As illustrated in FIG. 22 the apparatus 10 with the gate 28 open, is rolled over the support platform 40 containing the patient P. The support braces 35 are lowered and the hooks 37 associated therewith are engaged with the handles 55 of the patient support platform 40. The motor switch 39' is then activated to raise the patient support platform 40 into the patient support area 17, as seen in FIG. 23. The latching members are then utilized to latch the patient support platform 40 to the apparatus 10, the gate 28 closed and the patient ready for transport. Of course it should be noted that at any time during any of the sequence of events previously described, various accessories as also previously described may be mounted on or otherwise attached to the apparatus 10 of the present invention.

By the above, the present invention provides a patient care and transport apparatus which can mechanically move the patient vertically without assistance from any attendant, can weight the patient and can provide convenient carrying access for any patient care equipment and accessories. The present invention should contribute greatly to both patient comfort and the health of health care workers.

It will therefore be readily understood by those persons skilled in the art that the present invention is susceptible of a broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

I claim:

1. A patient transport and care apparatus for use when transporting human or animal hospitalized patents in a hospital environment without significant imposition on the patient, said patient transport and care apparatus comprising:

an upstanding skeletal frame structure having a plurality of wheels mounted thereto for rolling surface contact, said frame structure defining a patient support area and having longitudinally extending side portions and traversely extending end portions and being of a size and configuration to be selectively movable in and out of a generally surrounding relationship with a floor-standing patient support structure, with at least one of said traversely extending end portions being open for access to said patient support area when rolling said frame structure in and out of said standing relationship with the floor-standing patient support structure; and means for supporting a patient during transport on said apparatus, said patient support means being selectively mountable to said frame and movable between a patient support disposition and a storage disposition.

2. A patient transport and care apparatus according to claim 1 and further comprising at least one gate hingedly mounted to said frame adjacent said open end portion and movable between an opened condition away from said at least one open end portion for access to said patient support area when rolling said frame structure into and out of said surrounding relationship, and a closed condition in covering relation with said open end portion.

3. A patient transport and care apparatus according to claim 1 and further comprising means for lifting said patient support means within said frame structure, said lifting means being mounted to said frame structure.

4. A patient transport and care apparatus according to claim 3 and further comprising means for weighing a patient, said weighing means being mounted to said frame structure in association with said lifting means.

5. A patient transport and care apparatus according to claim 1 and further comprising means for caring for a patient mounted to said frame structure.

6. A patient transport and care apparatus according to claim 5, wherein said patient care means includes at least one of an oxygen supply and a medication supply.

7. A patient transport and care apparatus according to claim 1 and further comprising means for receiving and selectively distributing electric power mounted to said frame structure.

8. A patient transport and care apparatus according to claim 1, wherein said patient support means includes a patient support platform formed from flexible sheet material and supportable along side edges thereof by said frame structure, said platform being selectively movable transversely across said patient support area between a gathered, storage position and an extended position for patient support.

9. A patient transport and care apparatus according to claim 8, wherein said platform includes at least one rigid pole attached thereto and extending longitudinally with respect to said platform, and said frame structure includes a plurality of hooking clamps mounted thereto for engaging and retaining said pole and thereby said platform to maintain said platform at a predetermined position.

10. A patient transport and care apparatus according to claim 8, wherein said platform includes a plurality of grommeted openings formed therein and positioned for use as anchoring locations for patient restraint devices.

11. A patient transport and care apparatus according to claim 8, wherein said platform includes at least one vertically extending barrier portion projecting upwardly from said platform adjacent side edges thereof for preventing lateral patient movement beyond side edges of said platform.

12. A patient transport and care apparatus according to claim 11, wherein said barrier portion is formed integrally with and from the same sheet material as said platform.

13. A patient transport and care apparatus according to claim 11, wherein said barrier portion includes means to retain and support patient care equipment thereon.

14. A patient transport and care apparatus according to claim 13, wherein said support and retention means includes at least one pocket attached to an inwardly directed surface of said barrier portion.

15. A patient transport and care apparatus according to claim 1, wherein said frame structure includes at least one brake operably attached to at least one of said plurality of wheels said brake being operable to selectively prevent unwanted rolling motion of said apparatus.

16. A patient transport and care apparatus according to claim 1, wherein said patient support means includes two patient support platforms formed from flexible sheet material and supportable along side edges thereof by said frame structure, said platforms being mounted to said frame structure with one platform disposed in a spaced vertical relationship with the other said platform, at least one of said platforms being movable across said patient support area between a gathered, storage position and an extended position for patient support.

17. A patient transport and care apparatus according to claim 1, wherein said frame structure includes a superstructure projecting above said patient support means, said superstructure including at least one vertically oriented support member for supporting intravenous equipment on said apparatus.

18. A patient transport and care apparatus according to claim 4, wherein said frame structure includes a superstructure projecting above said patient support means, said superstructure having a plurality of horizontally oriented support members, and said lifting means includes an electric motor, a geared transmission operatively connected thereto, said electric motor and said transmission being mounted to said horizontally oriented support members, said lifting means further including means for operatively connecting said electric motor and said transmission to said patient support means, and means for selectively controlling the operation of said lifting means.

19. A patient transport and care apparatus according to claim 18, wherein said weighing means includes a scale operatively connected to said lifting means.

20. A patient transport and care apparatus according to claim 18, wherein said lifting means includes a pair of support braces operatively connected to said electric motor and selectively attachable to and detachable from said patient support means for selectively lifting a patient.

21. A patient transport and care apparatus according to claim 20, wherein said weighing means includes a scale operatively connected to said lifting means.

22. A patient transport and care apparatus according to claim 20, wherein said support braces are movable between a storage position and an operative position, and said superstructure includes means for retaining said support braces in said storage position.

23. A patient transport and care apparatus according to claim 18 and further comprising means for receiving and selectively distributing electric power mounted to said frame structure.

24. A patient transport and care apparatus according to claim 23, wherein said electric motor is a DC motor and said lifting means further includes means for storing and supplying DC electric power associated with said DC motor, means for charging said electric power storage means and means for supplying electric power from said electrical distribution system to said charging means.

25. A patient transport and care apparatus according to claim 1, wherein said frame structure includes a superstructure projecting upwardly beyond said patient support means.

26. A patient transport and care apparatus according to claim 25 and further comprising a patient trapeze suspended from said superstructure for patient initiated patient stabilization and support.

27. A patient transport and care apparatus according to claim 25 and further comprising means for reflecting images mounted to said superstructure in a configuration for an operator to view the image of a patient supported on said patient support means.

28. A patient transport and care apparatus according to claim 25 and further comprising a shelf adjustably mounted to said superstructure for movement between a stowage position and a use position, said shelf having a rotatable turntable mounted thereto, said shelf and turntable being for the support of medical patient monitoring equipment.

29. A patient transport and care apparatus according to claim 25, wherein said frame structure includes a plurality of cross members having a plurality of hooks mounted thereto, said hooks being configured for the support of body fluid drainage bags associated with a patient transported on said apparatus.

30. A patient transport and care apparatus according to claim 16, wherein at least one of said patient support platform includes a plurality of wheels mounted along two side edges thereof and said frame structure includes two raceways for supporting said wheels during rolling movement therealong and when said at least one platform is stationarily mounted thereto.

31. A patient transport and care apparatus according to claim 30 and further comprising means for releasably latching said wheeled platform onto said frame structure with said wheels supported by said raceway.

32. A patient transport and care apparatus according to claim 1 and further comprising a privacy curtain movably mounted to said frame structure and selectively movable in and out of covering relation with a portion of said skeletal frame structure to provide selective privacy for a patient supported on said patient support means.

33. A patient transport and care apparatus for use when transporting human or animal hospitalized patients in a hospital environment without significant imposition on the patient, said patient transport and care apparatus comprising:

an upstanding, skeletal frame structure having a plurality of wheels mounted thereto for rolling surface contact, said frame structure defining a patient support area, and including a superstructure projecting upwardly beyond said patient support area;

means for supporting a patient for transport on said apparatus, said patient support means selectively mountable to said frame structure and movable between a storage disposition and a patient support disposition;

means for lifting said patient support means, said lifting means being mounted to said superstructure and including an electric motor, means for selectively operatively connecting said lifting means to said patient support means and control means for selectively controlling said electric motor to cause vertical movement of said patient support means when said patient support means is operatively connected to said electric motor; and means for weighing a patient, said Weighing means being mounted to said frame structure in association with said lifting means, and including a load cell operatively connected to said patient support means, said load cell producing an electric signal proportional to the gravitational force exerted on said patient support means for displaying a numerical value associated with said gravitational force responsive to input from said load cell.

34. A patient transport and care apparatus according to claim 33 and further comprising means for receiving and selectively distributing electric power mounted to said frame structure.

35. A patient transport and care apparatus according to claim 34, wherein said electric motor is a DC motor and said lifting means further includes means for storing and supplying DC electric power associated with said DC motor, means for charging said electric power storage means and means for supplying electric power from said electrical distribution system to said charging means.

36. A patient transport and care apparatus according to claim 33 and further comprising means for selectively attaching said lifting means operatively to a patient support stretcher otherwise disassociated with said apparatus.

37. A patient transport and care apparatus according to claim 33, wherein said connecting means includes a pair of support braces operatively connected to said electric motor and selectively attachable to and detachable from said patient support means for selectively lifting a patient.

38. A patient transport and care apparatus according to claim 37, wherein said support braces are movable between a storage position and an operative position, and said superstructure includes means for retaining said support braces in said storage position.

39. A patient transport and care apparatus according to claim 33 and further comprising means for caring for a patient mounted to said frame structure.

40. A patient transport and care apparatus according to claim 39, wherein said patient care means includes at least one of an oxygen supply and a medication supply.

41. A patient transport and care apparatus according to claim 33, wherein said patient support means includes a patient support platform formed from flexible sheet material and supportable along side edges thereof by said frame structure, said platform being selectively movable transversely across said patient support area between a gathered, storage position and an extended position for patient support.

42. A patient transport and care apparatus according to claim 41, wherein said platform includes at least one rigid pole attached thereto and extending longitudinally with respect to said platform, and said frame structure includes a plurality of hooking clamps mounted thereto for engaging and retaining said pole and thereby said platform to maintain said platform at a predetermined position.

43. A patient transport and care apparatus according to claim 41, wherein said platform includes a plurality of grommeted openings formed therein and positioned for use as anchoring locations for patient restraint devices.

44. A patient transport and care apparatus according to claim 41, wherein said platform includes at least one vertically extending barrier portion projecting upwardly from said platform adjacent side edges thereof for preventing lateral patient movement beyond side edges of said platform.

45. A patient transport and care apparatus according to claim 44, wherein said barrier portion is formed integrally with and from the same sheet material as said platform.

46. A patient transport and care apparatus according to claim 44, wherein said barrier portion includes means to retain and support patient care equipment thereon.

47. A patient transport and care apparatus according to claim 41, wherein said patient support means includes two patient support platforms formed from flexible sheet material and supportable along side edges thereof by said frame structure, said platforms being mounted to said frame structure with one platform disposed in a spaced vertical relationship with the other said platform, at least one of said platforms being movable across said patient support area between a gathered, storage position and an extended position for patient support.

48. A patient transport and care apparatus according to claim 47, wherein said frame structure includes a superstructure projecting above said patient support means, said superstructure including at least one vertically oriented support stanchion for supporting intravenous equipment on said apparatus.

49. A patient transport and care apparatus according to claim 47, wherein at least one of said patient support platform includes a plurality of wheels mounted along two side edges thereof and said frame structure includes two raceways for supporting said wheels during rolling movement therealong and when said at least one platform is stationarily mounted thereto.

50. A patient transport and care apparatus according to claim 33, wherein said frame structure is sized and configured to selectively contain a floor-standing patient support structure otherwise disassociated with said apparatus, said frame structure having an open end portion for rolling movement of said frame structure into and out of a generally surrounding relationship with the patient support structure.

51. A patient transport and care apparatus according to claim 50 and further comprising at least one gate hingedly mounted to said frame adjacent said open end portion and movable between an opened condition away from said at least one open end portion for rolling movement of said frame structure into and out of said surrounding relationship, and a closed condition in covering relation with said open end portion.

52. A patient transport and care apparatus according to claim 33 and further comprising means for reflecting images mounted to said superstructure in a configuration for an operator to view the image of a patient supported on said patient support means.

53. A patient transport and care apparatus according to claim 33 and further comprising a shelf adjustably mounted to said superstructure for movement between a stowage position and a use position, said shelf having a rotatable turntable mounted thereto, said shelf and turntable being for the support of medical patient monitoring equipment.

54. A patient transport and care apparatus according to claim 33, wherein said frame structure includes a plurality of tubular cross members having a plurality of hooks mounted thereto, said hooks being configured for the support of body fluid drainage bags associated with a patient transported on said apparatus.

55. A patient transport and care apparatus for use when transporting human or animal hospitalized patients in a hospital environment without significant intrusion on the patient, said patient transport and care apparatus comprising:

an upstanding skeletal frame structure having a plurality of wheels mounted thereto for rolling surface contact, said frame structure defining a patient support area and including a superstructure projecting upwardly beyond said patient support area, said frame structure having an open end portion being sized and configured to selectively contain a floor-standing patient support structure otherwise disassociated with said apparatus by rolling movement into and out of a generally surrounding relationship with the patient support structure;

a patient support platform formed from flexible sheet material and selectively supportable along side edges thereof by said frame structure, said platform being selectively movable transversely across said patient support area between a storage disposition and an extended disposition for patient support;

a lifting assembly mounted to said superstructure in a spaced vertical relationship with said platform, said lifting assembly including an electric motor operatively connected to a pair of support braces, said support braces being selectively attachable to and detachable from said platform and pivotably mounted to said superstructure for movement between a stowage disposition and a disposition for selective attachment to and detachment from said platform; and a control assembly for selectively controlling said motor to cause vertical movement of said platform when said platform is connected to said support braces.

56. A patient transport and care apparatus according to claim 55 and further comprising means for receiving and selectively distributing electric power mounted to said frame structure.

57. A patient transport and care apparatus according to claim 55, wherein said electric motor is a DC motor and said lifting means further includes means for storing and supplying DC electric power associated with said DC motor, means for charging said electric power storage means and means for supplying electric power from said electrical distribution system to said charging means.

58. A patient transport and care apparatus according to claim 55 and further comprising means for caring for a patient mounted to said frame structure.

59. A patient transport and care apparatus according to claim 58, wherein said patient care means includes at least one of an oxygen supply and a medication supply.

60. A patient transport and care apparatus according to claim 55, wherein said patient support means includes two patient support platforms formed from flexible sheet material and supportable along side edges thereof by said frame structure, said platforms being selectively mountable to said frame structure with one platform disposed in a spaced vertical relationship with the other said platform, said platforms being movable across said patient support area between a gathered, storage position and an extended position for patient support.

61. A patient transport and care apparatus according to claim 60, wherein at least one of said patient support platform includes a plurality of wheels mounted along two side edges thereof and said frame structure includes two raceways for supporting said wheels during rolling movement therealong and when said at least one platform is stationarily mounted thereto.

62. A patient transport and care apparatus according to claim 55 and further comprising means for weighing a patient, said weighing means being mounted to said frame structure in association with said lifting means.

63. A patient transport and care apparatus according to claim 62, wherein said weighing means includes a load cell operatively connected to said patient support means, said load cell producing an electric signal proportional to the gravitational force exerted on said patient support means for displaying a numerical value associated with said gravitational force responsive to input from said load cell.

64. A patient transport and care apparatus according to claim 63 and further comprising means for receiving and selectively distributing electric power mounted to said frame structure.

65. A patient transport and care apparatus according to claim 63, wherein said platform includes a plurality of grommeted openings formed therein and positioned for use as anchoring locations for patient restraint devices.

66. A patient transport and care apparatus according to claim 55, wherein said platform includes a plurality of grommeted openings formed therein and positioned for use as anchoring locations for patient restraint devices.

67. A patient transport and care apparatus according to claim 55 and further comprising a shelf adjustably mounted to said superstructure for movement between a stowage position and a usage position, said shelf having a rotatable turntable mounted thereto, said shelf and turntable being for the support of medical patient monitoring equipment.

* * * * *